United States Patent
Parikh et al.

(10) Patent No.: US 10,677,930 B2
(45) Date of Patent: Jun. 9, 2020

(54) SYSTEMS AND METHODS FOR FREQUENCY DRIFT COMPENSATION FOR RADIO RECEIVERS

(71) Applicant: ATC Technologies, LLC, Reston, VA (US)

(72) Inventors: Ajay S. Parikh, North Potomac, MD (US); Santanu Dutta, Vienna, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 842 days.

(21) Appl. No.: 15/265,087

(22) Filed: Sep. 14, 2016

(65) Prior Publication Data

US 2017/0082756 A1   Mar. 23, 2017

Related U.S. Application Data

(60) Provisional application No. 62/220,394, filed on Sep. 18, 2015, provisional application No. 62/387,274, filed on Dec. 23, 2015.

(51) Int. Cl.
*H04B 1/18* (2006.01)
*G01S 19/37* (2010.01)
*G01S 19/22* (2010.01)

(52) U.S. Cl.
CPC ............. *G01S 19/37* (2013.01); *G01S 19/22* (2013.01)

(58) Field of Classification Search
CPC ....... H04B 1/40; H04B 7/1851; H04W 4/029; H04W 64/003; G01S 5/0036;
(Continued)

(56) References Cited

U.S. PATENT DOCUMENTS 5,109,532 A   4/1992   Petrovic et al.
6,701,133 B1   3/2004   Bennett
(Continued)

FOREIGN PATENT DOCUMENTS

WO   2008094962   8/2008

OTHER PUBLICATIONS

PCT Form ISA/206 and Annex to Form PCT/ISA/206 Communication Relating to the Results of the Partial International Search dated Sep. 8, 2017 (17 pages).
(Continued)

*Primary Examiner* — Quochien B Vuong
(74) *Attorney, Agent, or Firm* — Michael Best & Friedrich LLP

(57) ABSTRACT

A frequency drift compensation system for a radio receiver includes a pilot signal generator that is configured to generate two pilot signals, a local oscillator that is configured to generate a local oscillator frequency signal, a first mixer that generates a first offset pilot signal, a second mixer that generates a second offset pilot signal, and a summer that is configured to add the first offset pilot signal and the second offset pilot signal to the intermediate frequency signal to obtain a composite signal. The frequency drift compensation system includes a processor that is configured to detect frequency drift in the offset pilot signal responsive to the composite signal and to generate a frequency drift control signal to compensate for the frequency drift. Related radio receivers, GPS receivers, and methods are described.

35 Claims, 16 Drawing Sheets

(58) Field of Classification Search
CPC ......... G01S 5/0054; G01S 5/02; H03L 1/022;
H03L 1/027; H03L 7/00; H03L 7/099
USPC ............................ 455/12.1, 192.1, 255, 427
See application file for complete search history.

(56) References Cited

U.S. PATENT DOCUMENTS

| | | | | |
|---|---|---|---|---|
| 6,711,230 | B1* | 3/2004 | Nicholls | G04G 3/00 |
| | | | | 375/376 |
| 6,785,543 | B2 | 8/2004 | Karabinis | |
| 7,148,761 | B1* | 12/2006 | Shieh | H03L 1/026 |
| | | | | 331/66 |
| 7,251,467 | B2* | 7/2007 | Sendonaris | H04B 1/3805 |
| | | | | 455/255 |
| 7,333,548 | B2* | 2/2008 | Chen | H04L 27/2657 |
| | | | | 375/260 |
| 7,773,034 | B2* | 8/2010 | Levy | G01S 19/235 |
| | | | | 342/357.77 |
| RE43,137 | E | 1/2012 | Karabinis | |
| 8,125,284 | B2* | 2/2012 | Zhang | H03L 7/16 |
| | | | | 331/176 |
| 8,190,114 | B2 | 5/2012 | Karabinis et al. | |
| RE45,107 | E | 9/2014 | Karabinis | |
| 9,048,844 | B2* | 6/2015 | De Padova | H03K 3/011 |

OTHER PUBLICATIONS

PCT/US2016/067906 International Search Report and Written Opinion dated Nov. 2, 2017 (20 pages).

* cited by examiner

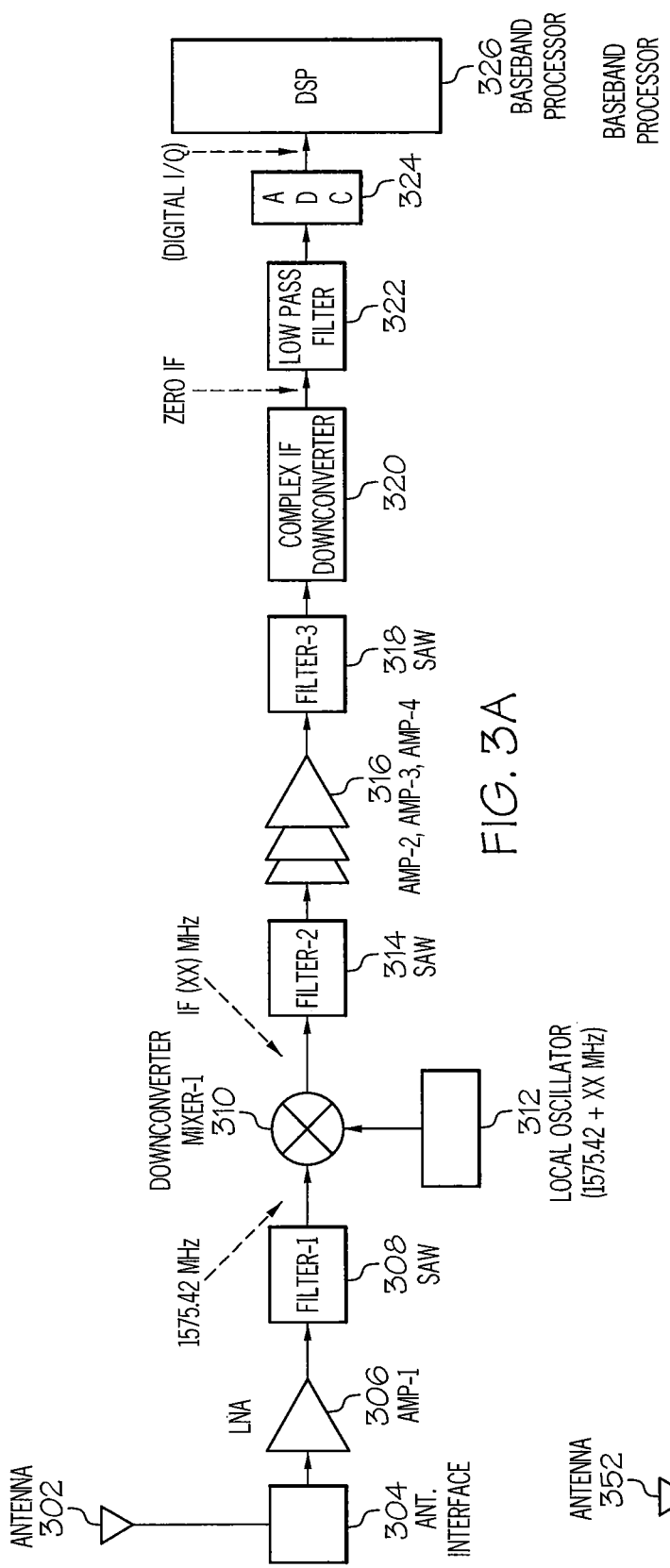
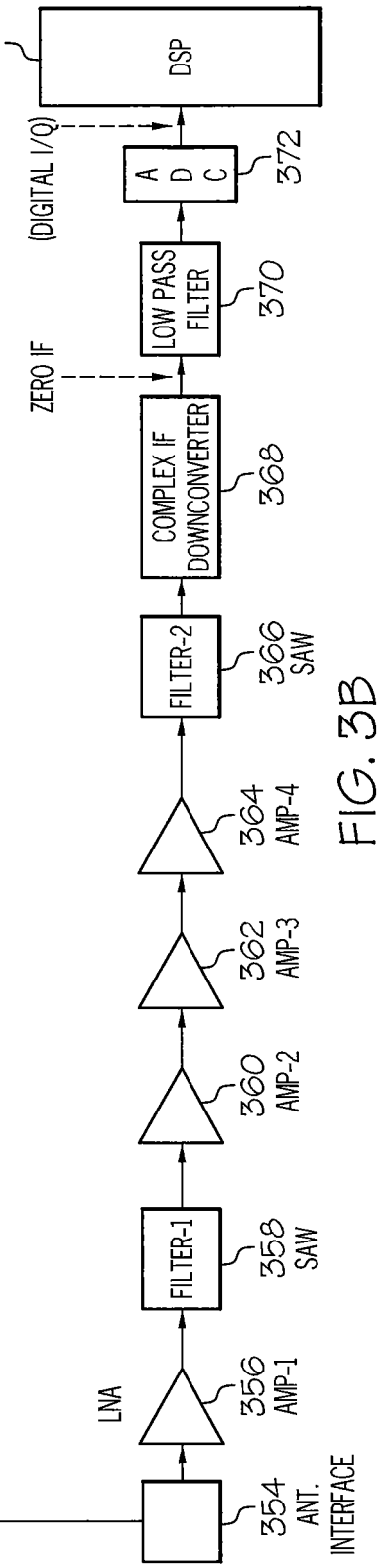
FIG. 3A
FIG. 3B

SYSTEMS AND METHODS FOR FREQUENCY DRIFT COMPENSATION FOR RADIO RECEIVERS

CROSS-REFERENCE TO RELATED APPLICATIONS

This application claims the benefit of and priority to U.S. Provisional Patent Application No. 62/220,394, filed Sep. 18, 2015, the disclosure of which is hereby incorporated herein by reference as if set forth in its entirety. This application also claims the benefit of and priority to U.S. Provisional Patent Application No. 62/387,274, filed Dec. 23, 2015, the disclosure of which is hereby incorporated herein by reference as if set forth in its entirety.

FIELD

Various embodiments described herein relate to communications systems and methods, and more particularly to radio receivers including GPS receivers.

BACKGROUND

A Global Navigation Satellite System (GNSS) is a satellite navigation system that provides the geographic location of a user's receiver anywhere in the world. The Global Positioning System (GPS) is an example of a GNSS. It is owned and operated by the US Air Force. GNSS/GPS systems may coexist with terrestrial networks in adjacent bands where satellite frequencies are used and/or reused terrestrially. It may be necessary to reduce or prevent radiation by the terrestrial network and the user equipments (UEs) from interfering with the GNSS/GPS communications. Specifically, GNSS/GPS receivers may need to exhibit tolerance to strong adjacent band signals from terrestrial networks.

SUMMARY

Various embodiments described herein can provide a frequency drift compensation system for a receiver. Although the embodiments described herein are applicable to many classes of radio receivers, GPS receivers are of particular interest to this application and are used as an example embodiment in order to explain specific embodiments. Notwithstanding the above, the embodiments described herein are applicable to any radio receiver. The GPS receiver includes a first frequency translator or down-converter, comprising a mixer followed by a bandpass filter, that is responsive to a received GPS signal and to a first local oscillator at a first local oscillator frequency to down-convert the received GPS signal into an intermediate frequency signal, and an intermediate frequency, or IF, filter that is configured to filter the intermediate frequency signal. The frequency drift compensation system includes a pilot signal generator that is configured to generate a first pilot signal at a first pilot signal frequency and a second pilot signal at a second pilot signal frequency. The frequency drift compensation system includes a second local oscillator that is configured to generate a second local oscillator frequency signal at a second local oscillator frequency. A second frequency translator, comprising a mixer followed by a bandpass filter, is responsive to the first pilot signal and to the second local oscillator signal to generate a first offset pilot signal at a first offset pilot frequency. A third frequency translator, comprising a mixer followed by a bandpass filter is responsive to the second pilot signal and to the second local oscillator signal and is configured to generate a second offset pilot signal at a second offset pilot frequency. The frequency drift compensation system includes a summer that is configured to add the first offset pilot signal and the second offset pilot signal to the intermediate frequency signal to obtain a composite signal. A processor is responsive to the composite signal and is configured to detect frequency drift in the first offset pilot signal and/or in the second offset pilot signal. The processor generates a frequency drift control signal to compensate for the frequency drift. The first local oscillator may be configured to adjust the first local oscillator frequency and/or the second local oscillator may be configured to adjust the second local oscillator frequency, responsive to the frequency drift control signal.

In some embodiments, the IF filter may have a center frequency that drifts as a function of temperature. The frequency drift control signal may be configured to compensate for the drift. The IF filter may include a surface acoustic wave (SAW) filter. The first local oscillator may be configured to adjust the first local oscillator frequency by performing operations including incrementing and/or decrementing the first local oscillator frequency based on the frequency drift control signal. The second local oscillator may be configured to adjust the second local oscillator frequency by incrementing and/or decrementing the second local oscillator frequency based on the frequency drift control signal.

In some embodiments, the processor may be configured to detect frequency drift by determining a first average pilot power associated with the first pilot signal based on the composite signal and the first pilot signal. The processor may determine a second average pilot power associated with the second pilot signal based on the composite signal and the second pilot signal. The processor may determine a difference between the second average pilot power and the first average pilot power. The processor may be configured to detect frequency drift by performing operations further including generating the frequency drift control signal to indicate increasing the first local oscillator frequency and/or the second local oscillator frequency, in response to the difference between the second average pilot power and the first average pilot power having a positive value that is greater than a threshold value. The processor may generate the frequency drift control signal to indicate decreasing the first local oscillator frequency and/or the second local oscillator frequency, in response to the difference between the second average pilot power and the first average pilot power having a negative value that is less than the negative of the threshold value. The processor may generate the frequency drift control signal to indicate no change to the first local oscillator frequency and/or the second local oscillator frequency, in response to the magnitude of the difference between the second average pilot power and the first average pilot power being less than the threshold value.

In some embodiments, the first local oscillator may be configured to increase the first local oscillator frequency by a first fixed frequency increment in response to the frequency drift control signal indicating increasing the first local oscillator frequency. The second local oscillator may be configured to increase the second local oscillator frequency by a second fixed frequency increment in response to the frequency drift control signal indicating increasing the second local oscillator frequency. The first local oscillator may be configured to decrease the first local oscillator frequency by a third fixed frequency decrement in response to the frequency drift control signal indicating decreasing the first local oscillator frequency. The second local oscillator may be configured to decrease the second local oscillator frequency by a fourth fixed frequency decrement in response to the frequency drift control signal indicating decreasing the second local oscillator frequency.

In some embodiments, the first local oscillator may be configured to increase the first local oscillator frequency by a first variable frequency increment of $\Delta P/(Q1+Q2)$ in response to the frequency drift control signal indicating increasing the first local oscillator frequency. The second local oscillator may be configured to increase the second local oscillator frequency by a second variable frequency increment of $\Delta P/(Q1+Q2)$ in response to the frequency drift control signal indicating increasing the first local oscillator frequency. $\Delta P$ may equal the difference between the second average pilot power and the first average pilot power. Q1 may be a slope for a lower transition band of the one or more filters in the receiver. Q2 may be a slope for an upper transition band of the one or more filters in the receiver.

In some embodiments, the first local oscillator may be configured to decrease the first local oscillator frequency by a third variable frequency decrement of $\Delta P/(Q1+Q2)$ in response to the frequency drift control signal indicating decreasing the first local oscillator frequency. The second local oscillator may be configured to decrease the second local oscillator frequency by a fourth variable frequency decrement of $\Delta P/(Q1+Q2)$ in response to the frequency drift control signal indicating decreasing the second local oscillator frequency. $\Delta P$ may equal the difference between the second average pilot power and the first average pilot power. Q1 may be a slope for a lower transition band of the one or more filters in the receiver. Q2 may be a slope for an upper transition band of the one or more filters in the receiver.

In some embodiments, the first average pilot power may be averaged over a time period based on a required response time. The second average pilot power may be averaged over the time period that is based on the required response time.

In some embodiments, the frequency drift compensation system may include the pilot signal generator, the second mixer and a bandpass filter that is configured to filter the first offset pilot frequency signal to obtain a first filtered offset pilot frequency signal. The frequency drift compensation system may include the pilot signal generator, the third mixer and a bandpass filter that is configured to filter the second offset pilot frequency signal to obtain a second filtered offset pilot frequency signal. The summer may be configured to add the first filtered offset pilot frequency signal, the second filtered offset pilot frequency signal, and the intermediate frequency signal to obtain the composite signal.

In some embodiments, the IF filter may include two or more active bandpass filters that filter the composite signal. The two or more active bandpass filters may be serially connected such that an input of a succeeding active bandpass filter is connected to an output of a preceding active bandpass filter. At least two of the two or more active bandpass filters may include a first amplifier, a second amplifier, and a frequency-selective filter that is connected between the first amplifier and the second amplifier.

In some embodiments, the filter that is configured to filter the intermediate frequency signal may include two or more active bandpass filters that filter the composite signal. The two or more active bandpass filters may be serially connected such that an input of a succeeding active bandpass filter is connected to an output of a preceding active bandpass filter. At least two of the two or more active bandpass filters may include a first amplifier, a second amplifier, and a frequency-selective filter that is between the first amplifier and the second amplifier. The frequency drift compensation system may be combined with the first mixer, the first oscillator, and the filter to comprise a portion of the front end of the GPS receiver.

The various embodiments described herein can be summarized, in essence, as comprising a frequency drift compensation method for a radio receiver for processing of a radio signal comprising a radio frequency spectrum, the radio receiver having an end-to-end cumulative frequency response, which is the combined frequency response of the all component segments of the receiver. The frequency drift compensation method may include injecting, by the radio receiver, one or more local pilot signals that sense a frequency drift of the cumulative frequency response of the radio receiver and adjusting a local oscillator frequency of the radio receiver to compensate for the frequency drift such that the cumulative frequency response is substantially centered on the radio frequency spectrum. In some embodiments, adjusting the local oscillator frequency of the radio receiver to compensate for the frequency drift may include performing closed loop adjustments that do not utilize a look up table of temperature characteristics of filters and/or other radio receiver components. The radio receiver may be a GPS receiver.

Various other embodiments described herein can provide a frequency drift compensation system for a GPS receiver. The GPS receiver includes a mixer and bandpass filter combination that is responsive to a received GPS signal and to a local oscillator to down-convert the received GPS signal into an intermediate frequency signal, and a filter that is configured to filter the intermediate frequency signal. The frequency drift compensation system includes a pilot signal injector circuit that is configured to inject a pilot signal into the intermediate frequency signal to obtain a composite signal, and a drift frequency compensator that is configured to provide a frequency drift control signal to the local oscillator based on frequency drift identified in the composite signal. The local oscillator may change the local oscillator frequency responsive to the frequency drift control signal.

In some embodiments, the local oscillator includes a first local oscillator. The local oscillator frequency may be a first local oscillator frequency. The mixer and bandpass filter combination includes a first mixer and bandpass filter combination. The pilot signal injector circuit may include a pilot signal generator that is configured to generate the pilot signal at a pilot signal frequency, a second local oscillator that is configured to generate a second local oscillator frequency signal at a second local oscillator frequency, a second mixer and bandpass filter combination that is configured to generate an offset pilot signal based on the pilot signal and the second local oscillator frequency signal, and/or a summer that is configured to inject the pilot signal into the intermediate frequency signal by adding the offset pilot signal and the intermediate frequency signal to obtain the composite signal.

In some embodiments, the pilot signal includes a first pilot signal, the pilot signal frequency includes a first pilot signal frequency, and/or the offset pilot signal includes a first offset pilot signal frequency. The pilot signal generator may be further configured to generate a second pilot signal at a second pilot signal frequency. The pilot signal injector circuit may include a third mixer and bandpass filter combination that is responsive to the second pilot signal and to the second local oscillator signal to generate a second offset pilot signal at a second offset pilot frequency. The summer may be further configured to inject the second offset pilot signal into the intermediate frequency signal to obtain the composite signal.

In some embodiments, the drift frequency compensator may include a processor configured to perform operations including determining a first average pilot power associated with the first pilot signal based on the composite signal, determining a second average pilot power associated with the second pilot signal based on the composite signal, and/or determining a difference between the second average pilot power and the first average pilot power. The processor may configured to perform operations further including generating the frequency drift control signal to indicate increasing the first local oscillator frequency and/or the second local oscillator frequency, in response to the difference between the second average pilot power and the first average pilot power being higher than a threshold value if the difference is positive, generating the frequency drift control signal to indicate decreasing the first local oscillator frequency and/or the second local oscillator frequency, in response to the difference between the second average pilot power and the first average pilot power being less than the threshold value if the difference is negative, and/or generating the frequency drift control signal to indicate no change to the first local oscillator frequency and/or the second local oscillator frequency, in response to the magnitude of the difference between the second average pilot power and the first average pilot power being less than a threshold value.

In some embodiments, the frequency drift compensation system may include the pilot signal generator, the second mixer, and first bandpass filter that is configured to filter the first offset pilot frequency signal to obtain a first filtered offset pilot frequency signal, and the pilot signal generator, the third mixer and second bandpass filter that is configured to filter the second offset pilot frequency signal to obtain a second filtered offset pilot frequency signal. The summer may be configured to add the first filtered offset pilot frequency signal and the second filtered offset pilot frequency signal to the intermediate frequency signal to obtain the composite signal. The filter that is configured to filter the intermediate frequency signal may include
two or more active bandpass filters that filter the composite signal. The two or more active bandpass filters may be serially connected such that an input of a succeeding active bandpass filter is connected to an output of a preceding active bandpass filter. At least two of the two or more active bandpass filters may include a first amplifier, a second amplifier, and a frequency-selective filter that is connected between the first amplifier and the second amplifier.

Various other embodiments described herein can provide a global positioning satellite (GPS) receiver. The GPS receiver may include a first local oscillator configured to generate a first local oscillator frequency signal, and/or a second local oscillator configured to generate a second local oscillator frequency signal. The GPS receiver may include a wideband filter with a center frequency in a GPS frequency band, an intermediate frequency (IF) converter configured to convert a GPS signal that has passed through the wideband filter into a down-converted GPS signal at an IF frequency, and/or a pilot signal generator configured to generate a pilot signal at a pilot signal frequency. A first mixer may be configured to mix first local oscillator frequency signal with the pilot signal to generate an offset pilot frequency signal at an offset pilot frequency, a bandpass filter configured to filter the offset pilot frequency signal to obtain a filtered offset pilot frequency signal, and/or an summer configured to add the filtered offset pilot frequency signal to the down-converted GPS signal to obtain a composite signal. The GPS receiver may include two or more active bandpass filters including a first amplifier, a second amplifier, and a frequency-selective filter that is between the first amplifier and the second amplifier, wherein the two or more active bandpass filters are arranged serially and filter the composite signal to obtain a filtered composite signal, a second mixer configured to mix the filtered composite signal with the second local oscillator frequency signal to obtain a baseband signal, and/or a baseband processor configured to generate a frequency drift control signal based on determining pilot power difference. The frequency drift control signal may be used by the first local oscillator and the second local oscillator to adjust the first local oscillator frequency signal and the second local oscillator frequency signal to compensate for the oscillator drift.

Various other embodiments described herein can provide a global positioning satellite (GPS) method. The method may include generating a pilot signal at a pilot signal frequency, offsetting a local oscillator frequency signal generated by a local oscillator by the pilot signal to obtain an offset pilot frequency signal at an offset pilot frequency, bandpass filtering the offset pilot frequency signal to obtain a filtered offset pilot frequency signal, and/or adding the filtered offset pilot frequency signal to a down-converted GPS signal that is based on a GPS frequency signal in the receiver of the GPS system to obtain a composite signal. The method may include determining a frequency drift based on the composite signal, and/or generating a frequency drift control signal to control the local oscillator. The frequency drift control signal may be based on the oscillator drift that was determined, to compensate for the frequency drift of one or more filters in a receiver for a global positioning satellite (GPS) system.

Various other embodiments described herein can provide a filter for a global positioning satellite (GPS) receiver. The filter may include a first low noise amplifier (LNA), a second LNA, and/or a bandpass filter between the first LNA and the second LNA. An input terminal of the first LNA may be responsive to a GPS signal in a GPS frequency band that has been down-converted to an intermediate frequency. The bandpass filter may have a center frequency that corresponds to the intermediate frequency. The bandpass filter may include a first bandpass filter. The filter may further include a third LNA that receives a signal corresponding to the output of the second LNA, a fourth LNA, and a second bandpass filter between the third LNA and the fourth LNA. In some embodiments, the bandpass filter may be a first bandpass filter. The filter may further include a plurality of third LNAs corresponding to a plurality of fourth LNAs with a plurality of bandpass filters therebetween. One of the plurality of the third LNAs may receive a signal corresponding to the output of another one of the plurality of fourth LNAs.

Various other embodiments described herein can provide a frequency drift compensation system for a GPS receiver. The GPS receiver includes a first mixer that is responsive to a received GPS signal and to a first local oscillator at a first local oscillator frequency to down-convert the received GPS signal into an intermediate frequency signal, and a filter that is configured to filter the intermediate frequency signal. The frequency drift compensation system includes a pilot signal generator that is configured to generate a pilot signal at a pilot signal frequency, a second local oscillator that is configured to generate a second local oscillator frequency signal at a second local oscillator frequency, a second mixer that is responsive to the pilot signal and to the second local oscillator signal to generate an offset pilot signal at an offset pilot frequency, a summer that is configured to add the offset pilot signal to the intermediate frequency signal to obtain a composite signal, and a processor that is responsive to the composite signal and is configured to detect frequency drift in the offset pilot signal and to generate a frequency drift control signal to compensate for the frequency drift. The first local oscillator may be configured to adjust the first local oscillator frequency and/or the second local oscillator may be configured to adjust the second local oscillator frequency, responsive to the frequency drift control signal.

In some embodiments, the pilot signal of the frequency drift compensation system may include a first pilot signal. The offset pilot frequency signal may include a first offset pilot frequency signal. The offset pilot frequency may include a first offset pilot frequency. The pilot signal generator may be further configured to generate a second pilot signal at a second pilot signal frequency. The frequency drift compensation system may further include a third mixer that is responsive to the second pilot signal and to the second local oscillator signal and is configured to generate a second offset pilot signal at a second offset pilot frequency. The summer may be further configured to add the second offset pilot signal to the first offset pilot signal and the intermediate frequency signal to obtain the composite signal.

In some embodiments, the processor may be configured to detect frequency drift by performing operations including determining a first average pilot power associated with the first pilot signal based on the composite signal and the first pilot signal. The processor may determine a second average pilot power associated with the second pilot signal based on the composite signal and the second pilot signal. The processor may further determine a difference between the second average pilot power and the first average pilot power.

BRIEF DESCRIPTION OF THE DRAWINGS

FIG. 3A is a block diagram of a conventional single intermediate frequency (IF) Global Navigation Satellite System (GNSS) receiver architecture.

FIG. 3B is a block diagram of a conventional direct down conversion zero IF GNSS receiver architecture.

DETAILED DESCRIPTION

Figure 1:
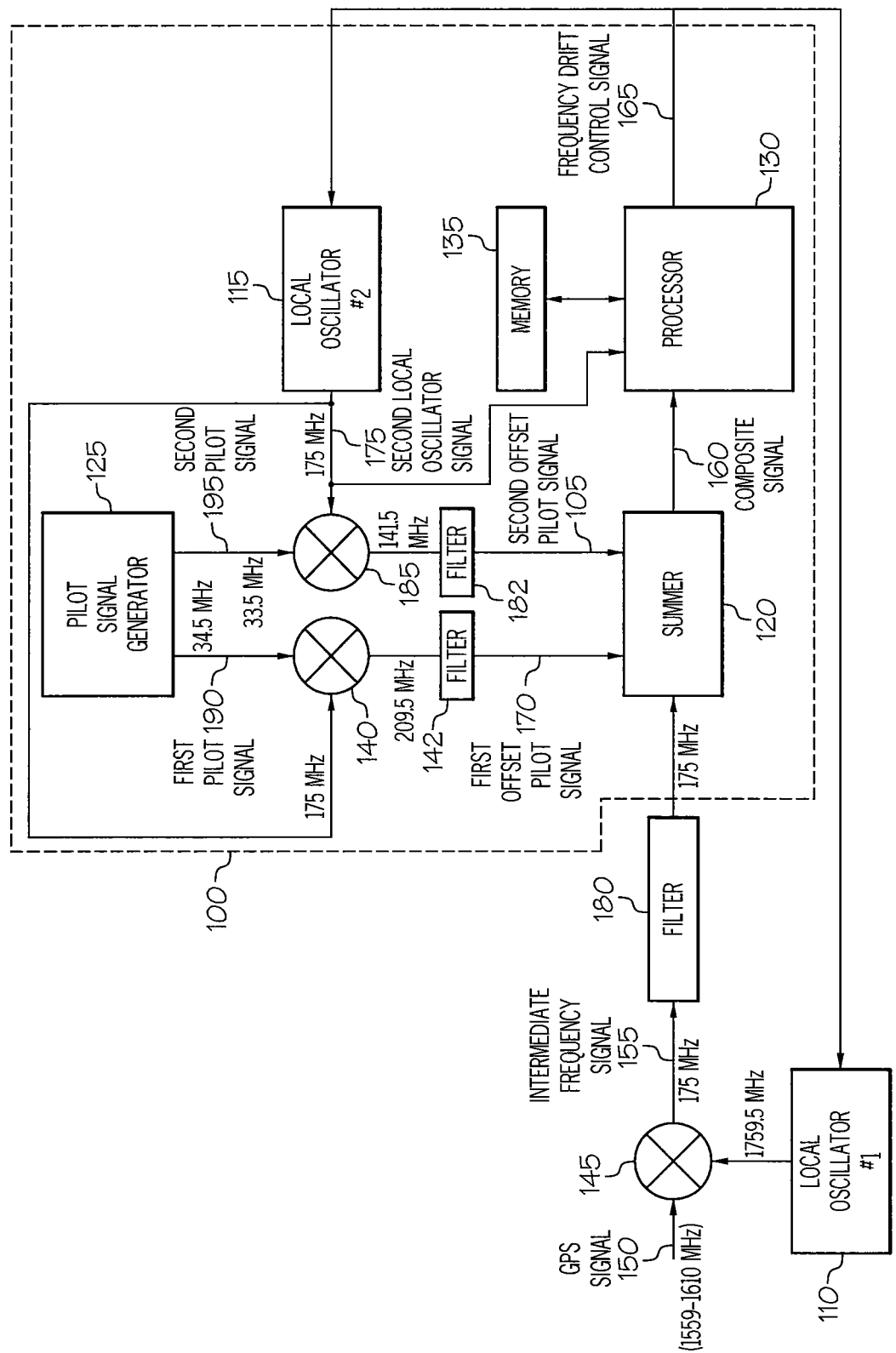
FIG. 1 is a block diagram of a GPS receiver including a frequency drift compensation system/method, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

The Global Navigation Satellite System (GNSS) is a satellite navigation system that provides the geographic location of a user's receiver anywhere in the world. In the United States, the Global Positioning System (GPS) is a space-based navigation system that provides location information of receivers. As used herein, the terms GNSS and GPS will be used interchangeably to represent any satellite navigation system that provides the geographic location.

GPS receivers have become ubiquitous in a variety of applications in airplanes, trains, ships, industrial equipment, farm equipment, and/or personal communication devices such as smart phones. GPS receivers may be standalone devices or integrated in another device such as a smartphone, camera, vehicle information and/or entertainment system. Conventional receivers for GPS are often not designed to be able to withstand high levels of adjacent band powers, resulting in spectrum close to the GPS frequency band(s) being underutilized. Modern communication applications such as voice, video, and data applications are increasingly hungry for spectrum additional spectrum. Furthermore, GPS systems may coexist with terrestrial networks in adjacent bands where satellite frequencies are used and/or reused terrestrially. It may be necessary to mitigate overload interference to GPS receivers from relatively high power radiation by the terrestrial network and the user equipment in the adjacent bands. Specifically, GPS receivers may need to exhibit tolerance to strong adjacent band signals from terrestrial networks. This tolerance may be achieved by highly frequency selective filters, which may be subject to frequency drift and a consequent degradation in the rejection of the adjacent band terrestrial signals. Therefore, it may be advantageous for the highly frequency selective filters to have methods for mitigating, or compensating for, the frequency drift.

Various embodiments described herein may arise from the recognition that underutilization of frequency bands adjacent to GPS frequency bands is an undesirable side effect of poor conventional GPS receiver designs that offer limited radio frequency (RF) filtering in the front end. Conventional GPS receiver designs thus may not sufficiently filter GPS frequency sidebands. Frequency drift due to temperature variation of RF front end filters exasperates poor filtering of the GPS frequency sidebands. A frequency drift compensation system/method for the GPS receiver, according to various embodiments described herein, may enable GPS receivers to provide greater rejection of adjacent band powers. In some embodiments, the frequency drift compensation system/method may include a self-calibrating closed loop producing a GPS receiver design that is more tolerant of strong adjacent band signals. This additional robustness stems from the ability in the design to use filters with greater frequency selectivity, which might otherwise be impractical owing to frequency response drifts caused by temperature and manufacturing variations. Additionally, Intermediate Frequency (IF) filter center frequencies may drift due to the environmental effects and may be compensated based on detecting shifts in detected pilot signal powers. For example, the frequency drift compensation system/method may include a pilot signal injector circuit that is configured to inject a pilot signal into the intermediate frequency signal to obtain a composite signal, and a drift frequency compensator that is configured to provide a frequency drift control signal to the local oscillator based on frequency drift identified in the composite signal. The local oscillator changes the local oscillator frequency responsive to the frequency drift control signal.

A basic approach is described first, with specific embodiments described subsequently. One or more pilot signals are added locally to the received signal inside the receiver so that the pilot signals are located (spectrally) on either the lower slope, or the upper slope or both, of the cumulative bandpass frequency response to the receiver. Drift of the cumulative frequency response due to temperature or manufacturing variations is sensed as follows. The time-averaged received power level, or levels, of the one or more pilot signals are measured by a processor in the receiver. The said measured values are operationally processed to optimally estimate the frequency response drift. The estimated drift is used to adjust the receiver's local oscillators' frequencies, responsive to which, an Intermediate Frequency (IF) of the receiver is adjusted. As a result of adjusting the IF, the drifted cumulative frequency response of the receiver once again optimally spans, or overlaps with, the spectrum of the desired signal.

Referring now to FIG. 1, a block diagram of a frequency drift compensation system/method 100 for a GPS receiver is illustrated, according to some embodiments described herein. A received GPS signal 150 is input to a first mixer 145. The first mixer 145 is responsive to the received GPS signal 150 and to a first local oscillator 110 at a first local oscillator frequency to down-convert the received GPS signal 150 into an intermediate frequency signal 155. The intermediate frequency signal 155 is filtered by filter 180, which may be, in some embodiments, a bandpass filter. The filter 180 may have a center frequency that drifts as function of temperature. In some embodiments, a pilot signal generator 125 is configured to generate a first pilot signal 190 at a first pilot signal frequency and a second pilot signal 195 at a second pilot signal frequency. The frequency drift compensation system 100 includes a second local oscillator 115 that is configured to generate a second local oscillator signal 175 at a second local oscillator frequency. A mixer 140 that is responsive to the first pilot signal 190 and to the second local oscillator signal 175 may be filtered by filter 142 to generate a first offset pilot signal 170 at a first offset pilot frequency. A mixer 185 that is responsive to the second pilot signal 195 and to the second local oscillator signal 175 may be filtered by filter 182 to generate a second offset pilot signal 105 at a second offset pilot frequency. A summer 120 is configured to add the first offset pilot signal 170 and the second offset pilot signal 105 to the intermediate frequency signal 155 or to a filtered version of the intermediate frequency signal 155 output by filter 180 to obtain a composite signal 160.

Still referring to FIG. 1, in some embodiments, a processor 130 is configured to detect frequency drift in the first offset pilot signal 170 and the second offset pilot signal 105 responsive to the composite signal 160 and to generate a frequency drift control signal 165 to compensate for the frequency drift. The processor 130 may be coupled to a memory 135 that stores information related to the various signals described herein for use in computation of the frequency drift control signal 165. The frequency drift control signal 165 is configured to compensate for the temperature-based drift associated with the IF filters in the processor 130. In some embodiments, filter 180 may include a surface acoustic wave (SAW) filter. Processor 130 detects frequency drift by determining a first average pilot power associated with the first pilot signal 190 based on the composite signal 160 and the first pilot signal 190, and/or by determining a second average pilot power associated with the second pilot signal 195 based on the composite signal 160 and the second pilot signal 195. A difference between the second average pilot power and the first average pilot power may be used to determine frequency drift by the processor 130.

Still referring to FIG. 1, the first local oscillator 110 adjusts the first local oscillator frequency and/or the second local oscillator 115 adjusts the second local oscillator frequency, responsive to the frequency drift control signal 165. The first local oscillator 110 may adjust the first local oscillator frequency by performing operations such as incrementing and/or decrementing the first local oscillator frequency based on the frequency drift control signal 165. The second local oscillator 115 may adjust the second local oscillator frequency by incrementing and/or decrementing the second local oscillator frequency based on the frequency drift control signal 165.

Further referring to FIG. 1, the processor 130 detects frequency drift and generates the frequency drift control signal 165 based on various criteria. In some embodiments, the second local oscillator signal 175 may be fed back to the processor 130. The processor 130 may generate the frequency drift control signal 165 to indicate increasing the first local oscillator frequency and/or increasing the second local oscillator frequency, when the difference between the second average pilot power and the first average pilot power is higher than a fixed or variable threshold value. The processor 130 may generate the frequency drift control signal 165 to indicate decreasing the first local oscillator frequency and/or decreasing the second local oscillator frequency, when the difference between the second average pilot power and the first average pilot power is less than a fixed or variable threshold value. The processor 130 may generate the frequency drift control signal 165 to indicate no change to the first local oscillator frequency and/or no change to the second local oscillator frequency, when the difference between the second average pilot power and the first average pilot power is less than a fixed or variable threshold value and the difference between the second average pilot power and the first average pilot power is higher than a fixed or variable threshold value. In some embodiments, the fixed or variable threshold values may be the same. In some embodiments, the first local oscillator 110 increases the first local oscillator frequency by a first fixed frequency increment when the frequency drift control signal 165 indicates increasing the first local oscillator frequency. The second local oscillator 115 increases the second local oscillator frequency by a second fixed frequency increment when the frequency drift control signal 165 indicates increasing the second local oscillator frequency. Similarly in some embodiments, the first local oscillator 110 decreases the first local oscillator frequency by a third fixed frequency decrement when the frequency drift control signal 165 indicates decreasing the first local oscillator frequency. The second local oscillator 115 decreases the second local oscillator frequency by a fourth fixed frequency decrement in response to the frequency drift control signal 165 indicating decreasing the second local oscillator frequency.

Still referring to FIG. 1, in some embodiments, the local oscillators 110, 115 are adjusted based on the slope of a transition band of one or more filters in the receiver. The first local oscillator 110 increases the first local oscillator frequency by a first variable frequency increment of $\Delta P/(Q1+Q2)$ when the frequency drift control signal 165 indicates increasing the first local oscillator frequency. The second local oscillator 115 increases the second local oscillator frequency by a second variable frequency increment of $\Delta P/(Q1+Q2)$ when the frequency drift control signal 165 indicates increasing the second local oscillator frequency. In some embodiments, the first local oscillator 110 decreases the first local oscillator frequency by a third variable frequency decrement of $\Delta P/(Q1+Q2)$ when the frequency drift control signal 165 indicates decreasing the first local oscillator frequency. The second local oscillator 115 decreases the second local oscillator frequency by a fourth variable frequency decrement of $\Delta P/(Q1+Q2)$ when the frequency drift control signal 165 indicates decreasing the second local oscillator frequency. As used above, $\Delta P$ equals the difference between the second average pilot power and the first average pilot power, Q1 indicates the slope for a lower transition band of one or more filters in the receiver, and Q2 indicates the slope for an upper transition band of one or more filters in the receiver. The first average pilot power may be averaged over a time period that is at least twice a period of the intermediate frequency signal 155. The second average pilot power may be averaged over a time period that is at least twice the period of the intermediate frequency signal 155.

To better explain the concept of the above frequency plan, example frequencies are shown on FIG. 1. These frequencies are not unique to the present inventive concepts and are provided merely as examples. Other frequency plans are feasible, conforming to the methods and systems taught here, and are covered by this invention disclosure.

Figure 2:
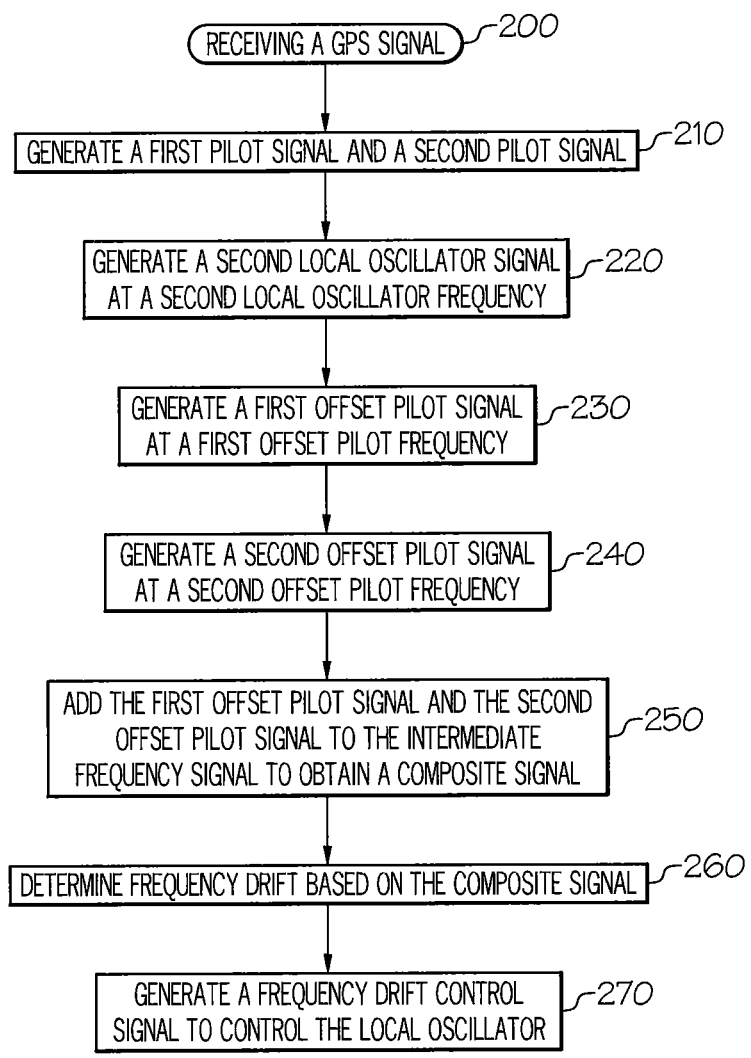
FIG. 2 is a flowchart of operations for frequency drift compensation of a GPS system, according to various embodiments described herein.

FIG. 2 is a flowchart of operations for a GPS system/method. The GPS receiver may include a first mixer that is responsive to a received GPS signal. The GPS receiver may include a first local oscillator at a first local oscillator frequency to down-convert the received GPS signal into an intermediate frequency signal. The GPS receiver may include a filter that is configured to filter the intermediate frequency signal. Referring now to FIG. 2, a GPS signal may be received at block 200. At block 210, a first pilot signal and a second pilot signal are generated that are at pilot signal frequencies such as, for example, 34.5 MHz and 33.5 MHz. At block 220, a second local oscillator frequency signal is generated at a second local oscillator frequency. At block 230, the first local oscillator frequency signal is offset by the first pilot signal to obtain a first offset pilot frequency signal at a first offset pilot frequency. For example, the first local oscillator frequency signal may be at 175 MHz and the first pilot signal may be at 34.5 MHz to produce the first offset pilot frequency signal at 209.5 MHz. At block 240, the second local oscillator frequency signal is offset by the second pilot signal to obtain a second offset pilot frequency signal at a second offset pilot frequency. For example, the second local oscillator frequency signal may be at 175 MHz and the second pilot signal may be at 33.5 MHz to produce the second offset pilot frequency signal at 141.5 MHz. At block 250, the filtered offset pilot frequency signal is added to a down-converted GPS signal that is based on the GPS frequency signal in the receiver of the GPS system to produce a composite signal. At block 260, the frequency drift is determined based on the composite signal. At block 270, a frequency drift control signal is generated based on the detected pilot signal power to control the local oscillators and to compensate the frequency drift of one or more IF filters in the receiver for the GPS system.

Further Discussion of Embodiments

Conventional L band GPS/GNSS receivers are not usually designed to tolerate high power level adjacent band carriers. As a result, receiver performance may be severely degraded in the presence of high power level adjacent band carriers. Some receiver designs have considered the adjacent band carriers/interferers. However, the assumed spectrum location of these carriers are tens, if not hundreds of megahertz from the GNSS band edges. Due to these limitations with respect to adjacent band carriers, the use of spectrum close to the GNSS band is typically under-utilized in terms of power and bandwidth, resulting in inefficient use of valuable L band spectrum.

Furthermore, received GNSS signals from satellites are of very low power. Therefore, GNSS receivers are designed with emphasis on minimizing the Noise Figure (NF) by not incurring excessive losses in front end bandpass filters. Hence, conventional GPS receivers offer limited use of adjacent band carriers. Conventional receiver architectures are illustrated in FIG. 3A and FIG. 3B. Although FIGS. 3A and 3B illustrate single IF stages, these conventional receiver architectures may also utilize multiple IF stages.

FIG. 3A is a block diagram of a conventional single intermediate frequency (IF) Global Navigation Satellite System (GNSS) receiver architecture. Referring to FIG. 3A, the GNSS signal received at the antenna 302 through the antenna interface 304 is amplified by the Low Noise Amplifier (LNA) 306. The signal is filtered by a surface acoustic wave (SAW) filter 308 and down-converted by a mixer 310 to a non-zero Intermediate frequency (IF). The down-conversion uses a local oscillator 312 that may provide a signal at a frequency at an offset from the GNSS center frequency 1575.42 (i.e. 1575.42+XX MHz). The IF signals are further amplified by one or more amplifiers 316, filtered by additional SAW filters 314 and 318 and then may be down-converted by a Complex IF down-converter 320 to baseband (zero IF) in-phase "I" and quadrature-phase "Q" analog signals. The I and Q components of the baseband signal, when viewed together, may be referred to as a complex baseband signal. The complex baseband signal is filtered once again by a low pass filter 322. The filtered complex baseband signal is digitized by the Analog to Digital Converter (ADC) 324 for further processing by a baseband Digital Signal Processor (DSP) 326. The dual down-conversion by in-phase and quadrature-phase local oscillators may be referred to as complex down-conversion.

Regarding front end design drivers, key factors determining the receiver's inband performance may include: (1) minimizing the Noise Figure (NF), (2) achieving an optimum RF/IF gain and (3) maximizing the linearity of amplifiers. These key factors may be prioritized in the indicated order. RF bandpass filters are used to reject strong adjacent band signals so as not to overload nonlinear devices, such as amplifiers and mixers, in subsequent stages. However, because of NF considerations, the bulk of the frequency selective components are typically placed after the LNA 306. In some designs, limited frequency selectivity is usually assigned to filters before the LNA 306 as the frequency selectivity of a bandpass filter may be directly related to its insertion loss. Sometimes, in conventional designs, no bandpass filter precedes the first LNA, as illustrated in FIGS. 3A and 3B, although a low selectivity preselector filter may be included.

FIG. 3B is a block diagram of a conventional direct down conversion (zero IF) GNSS receiver architecture. Referring to FIG. 3B, the GNSS signal received at the antenna 352 through the antenna interface 354 is amplified by the Low Noise Amplifier (LNA) 356. The signal is filtered by a surface acoustic wave (SAW) filter 358. Amplifiers 360, 362, and/or 364 may provide the necessary gain of the GNSS signal. Filters 358 and/or 366 attenuate the adjacent band signals to protect the amplifiers 360, 362, and/or 364 from overload. The output of amplifier 364 may be filtered by an additional SAW filter 366, after which the signal may be down-converted by a Complex IF down-converter 368 to baseband (zero IF) in-phase "I" and quadrature-phase "Q" analog signals. The I and Q components of the baseband signal, when viewed together, may be referred to as a complex baseband signal. The complex baseband signal may be filtered once again by a low pass filter 370. The filtered complex baseband signal may be digitized by the Analog to Digital Converter (ADC) 372 for further processing by a baseband Digital Signal Processor (DSP) 374. The filter 370 before the ADC determines the noise power bandwidth since filters 358, 366, and 370 usually have successively lower bandwidth. The sampling frequency of a Sampling & Hold circuit in the ADC 372 is selected to avoid spectral overlapping (i.e. aliasing) of the complex baseband signals after sampling. The sampled I and Q signals are processed by the DSP 374 to perform pseudo range measurements and other functions.

Figure 4:
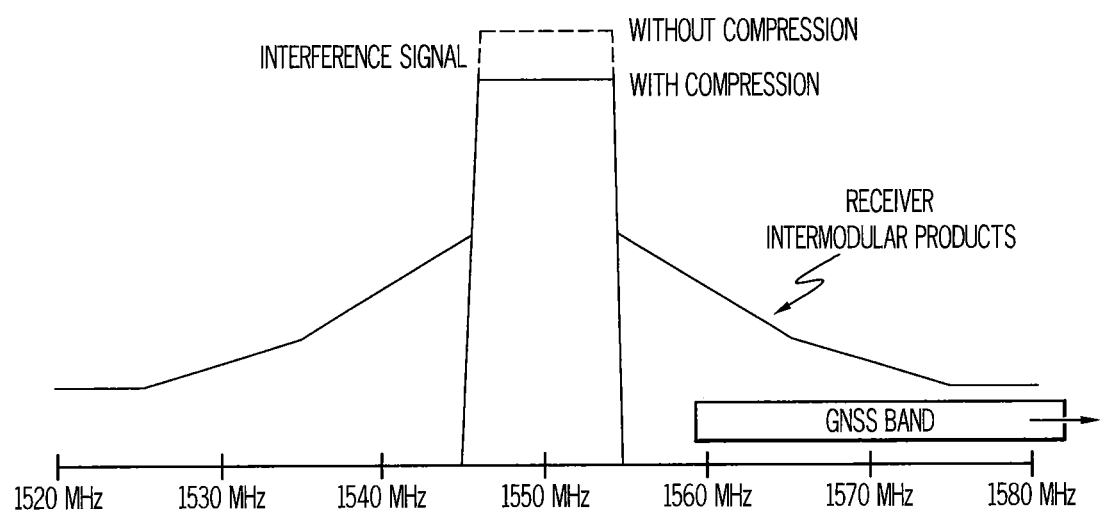
FIG. 4 graphically illustrates the gain compression and intermodulation noise in the RF front end of the conventional receiver design of FIG. 3A.

The conventional GPS/GNSS receiver design of FIGS. 3A and 3B may have several shortcomings. These conventional design approaches may offer limited filtering in the front end of the receiver. When high level adjacent band carriers/interference are present at the antenna input, the nonlinear components in the receiver may cause gain compression and generate in-band intermodulation products as shown in FIG. 4. FIG. 4 illustrates the gain compression and intermodulation noise in the RF front end of the conventional receiver design of FIG. 3A. The nonlinearity is contributed mainly by amplifiers such as LNA 306 in FIG. 3A or LNA 356 in FIG. 3B that are overdriven into their non-linear operating region. However, mixer 310 of FIG. 3A may also make contributions to the nonlinearity of the receiver. Receiver gain compression reduces the power of the desired GNSS signals relative to the background noise and interference. The intermodulation noise generated in the front end of a receiver, if it falls in GNSS band, may not be easily filtered out in the subsequent stages.

Furthermore, in conventional designs, the selectivity of the RF filters, especially those using surface acoustic wave (SAW) technology, is limited by temperature stabilities. The temperature instability of the frequency response of SAW filters can presently be as high as −200 ppm/° C. to −500 ppm/° C., causing 4 to 10 MHz frequency drift over the typical environmental temperature ranges. Hence, there has not been much interest in substantially increasing the frequency selectivity of RF/IF SAW filters. Therefore, the aggregate selectivity of filters beyond the first few elements of the RF stage of a receiver have traditionally not determined how close a strong adjacent band signal could be to the edge of the GNSS band. As a result, traditional GNSS receivers are generally incapable of tolerating the high levels of adjacent band carriers that they would have tolerated had the frequency drift of the filters been compensated.

One way to compensate for SAW filter drift due to temperature variation, as used in conventional receiver designs, is to down-convert GNSS signals to a lower Intermediate Frequency (IF), implement an IF bandpass filter by a cascade of SAW/ceramic filters, and then up-convert the IF back to the original GNSS frequencies. One motivation for this design approach is that the temperature drift of filters at lower IFs is smaller than at higher RFs. Additionally, at lower frequencies, it may be easier to realize practical bandpass filters with improved selectivity than at higher frequencies. This type of filter drift compensation may be performed by selecting Local Oscillator (LO) frequencies of up/down-converters based on a measured temperature inside the GNSS receiver and corresponding values in a stored look-up table. The look-up table may define the LO frequency as a function of temperature. This use of a temperature dependent look-up table arrangement adjusts the IF so that it is approximately at the center of the shifted frequency response of the filters over the expected range of ambient temperatures. This solution is an open loop solution and may have one or more of the following limitations: (1) the manufacturer has to create an accurate calibration table for "filter selectivity shift versus temperature" for each GNSS receiver during the testing process. A single table may not suffice for all receivers built according to a particular design as different samples of the same filter may have different temperature coefficients; and (2) this solution requires accurate ambient temperature measurement inside the GNSS receiver.

In order to address the above described limitations of conventional GPS receiver designs, frequency drift compensation systems are proposed, according to various embodiments described herein. According to various embodiments described herein, the GNSS receiver design can enable the reception of navigation signals in the L1 GNSS band, including GPS, Galileo, BeiDou and/or GLONASS, in the presence of strong adjacent band signals with a guard band relative to the edge of the GNSS band of less than 5 MHz. The adjacent band signals may be terrestrial LTE signals from base stations operating with an Equivalent Isotropically Radiated Power (EIRP) of 32 dBW, and/or handsets operating with an EIRP of −7 dBW.

According to various embodiments described herein, with judicious selection of commercially available Off-The-Shelf (COTS) amplifiers and highly frequency-selective but low loss RF filters, placement of these amplifiers and RF filters in the receiver chain, and/or using self-calibrating closed loop methods, a wideband GNSS receiver may be designed which is more tolerant of strong, close in frequency, adjacent band signals than was possible with conventional designs.

Figure 5:
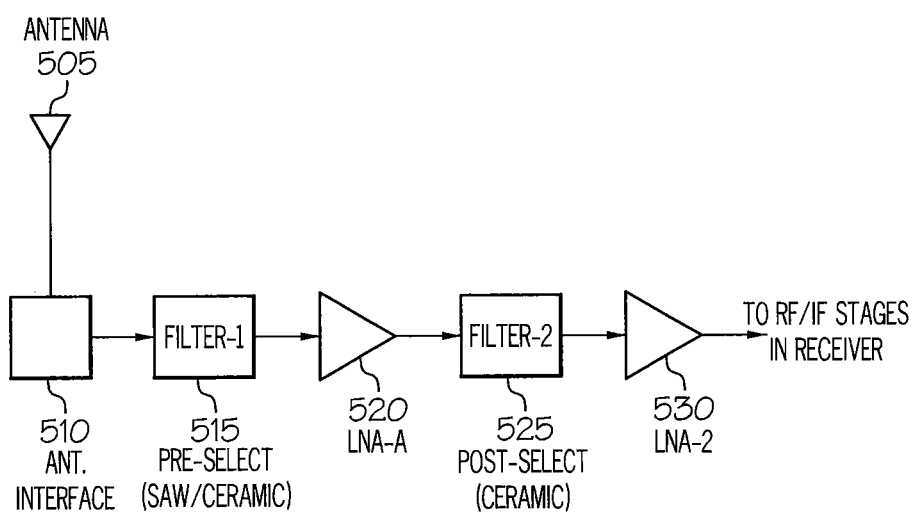
FIG. 5 is a block diagram of an RF front end of a wide band GNSS receiver, according to various embodiments described herein.

FIG. 5 is a block diagram of an RF front end of a wide band GNSS receiver, according to various embodiments described herein. Referring to FIG. 5, the GNSS signal received at the antenna 505 through the antenna interface 510 are first filtered by a low insertion loss, highly selective, preselect RF band pass filter 515 implemented with Ceramic, SAW, and/or bulk acoustic wave (BAW) technology. Even with a superior bandpass filter, relatively moderate frequency selectivity can be achieved by this filter to produce minimize insertion loss. More filtering may be provided down the receiver chain. The filtered signals are then amplified by a highly linear Low Noise Amplifier 520, with a 1 dB Gain Compression Point (1 dB GCP) and with low Noise Figure (NF) specifications. The LNA 520 may have sufficiently small signal gain to minimize the effect of thermal noise contribution from the subsequent RF/IF stages. The amplified signal may then pass though a post-select filter 525, which may be a ceramic filter. The post-select filtered signal may then be amplified by LNA 530 before providing the signal to RF and/or IF stages of the receiver. For example, the output of LNA 530 may be provide as an input to mixer 145 of FIG. 1 or as an input to mixer 315 of FIG. 3A. These signals may be coupled directly to the subsequent stages of the receiver, or through an RF cable if the front end circuitry is implemented in an active antenna assembly.

Figure 6:
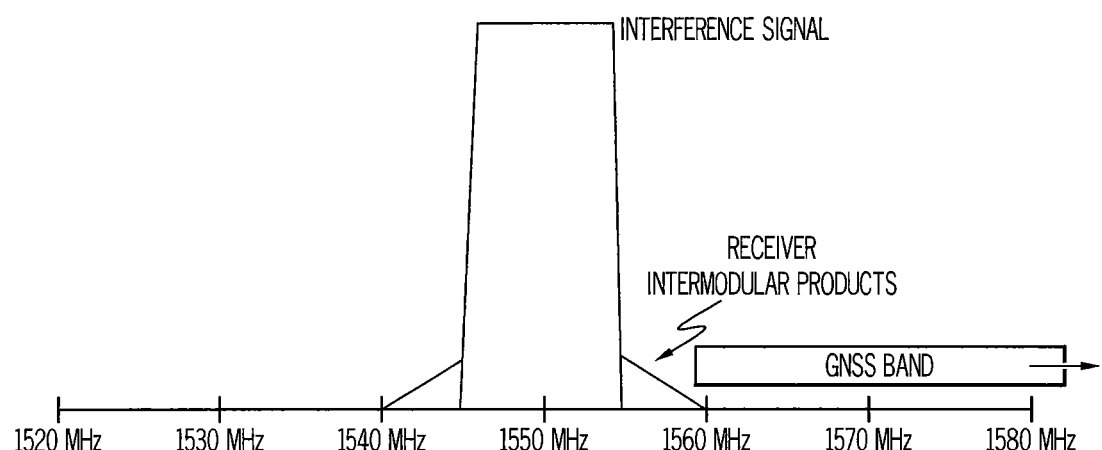
FIG. 6 graphically illustrates the gain compression and intermodulation noise in the RF front end of the wide band GNSS receiver design of FIG. 5, according to various embodiments described herein.

FIG. 6 illustrates the gain compression and intermodulation noise in the RF front end of the wide band GNSS receiver design of FIG. 5. Referring to FIG. 6, reduced in-band intermodulation products are generated in the front end, even with the presence of strong adjacent band carriers at the antenna input. The gain compression in LNA 520 of FIG. 5 is almost non-existent and a negligible level of intermodulation products are generated in the GNSS band. The post-select filter 525 of FIG. 5 serves to further increase the frequency selectivity at close-in interference frequencies, with moderate insertion loss but with steeper frequency response when placed after LNA 520. The post select filter 525 may be implemented with ceramic technology that offers superior frequency selectivity and center frequency stability with temperature variation. The post-select filter 525 and LNA 530, along with characteristics of LNA 520 of FIG. 5, produce the substantially reduced in-band intermodulation products, as illustrated in FIG. 6.

Figure 7:
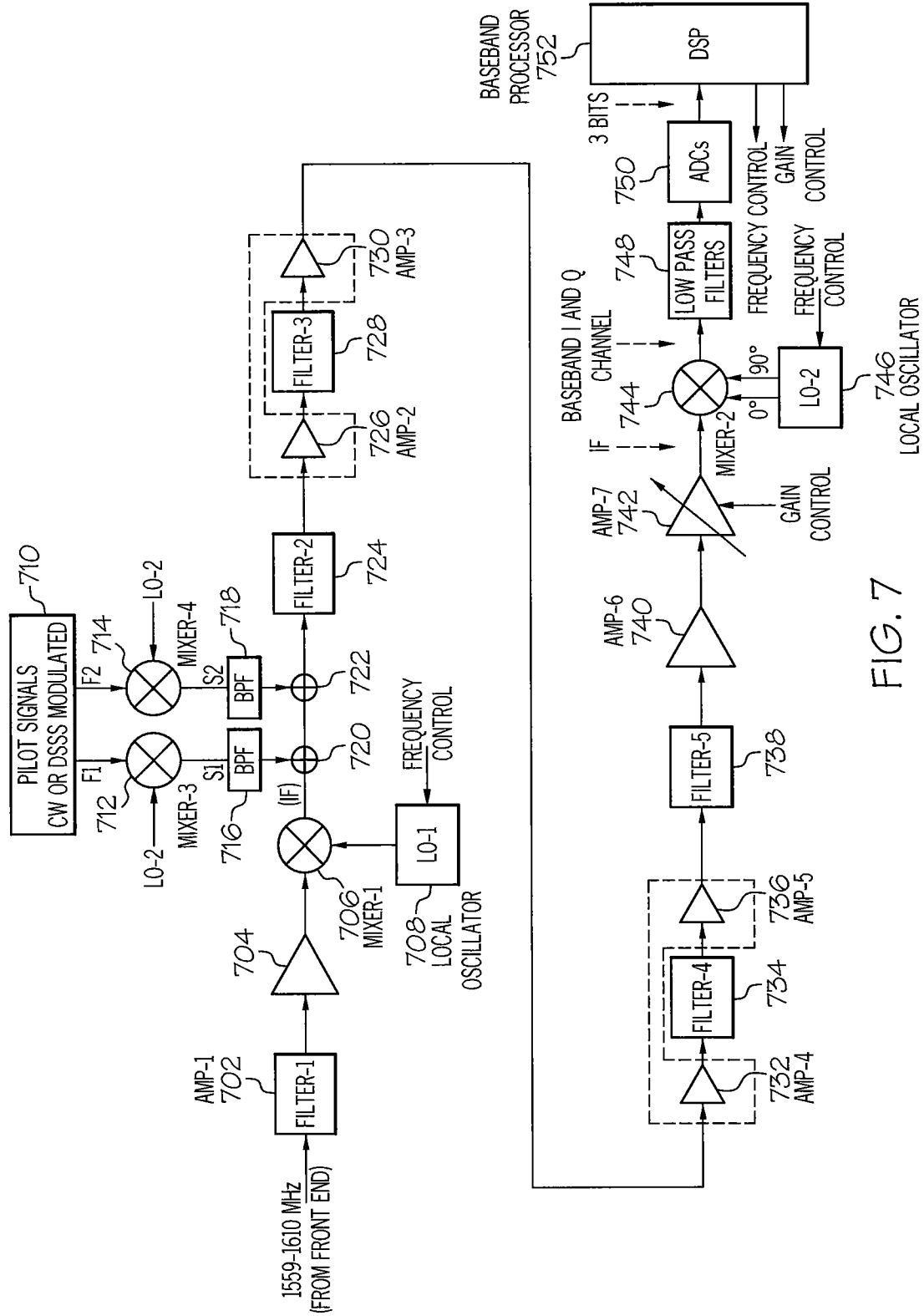
FIG. 7 is a block diagram including the IF and baseband processing sections of a frequency drift compensation system/method for a GPS receiver, according to various embodiments described herein.

FIG. 7 is a block diagram of the IF and baseband processing sections of a frequency drift compensation system for a GNSS receiver, according to various embodiments described herein. As illustrated in FIG. 7, partially filtered GNSS signals from the RF front end of FIG. 5 are again filtered by filter 702 to provide additional rejection at the close-in frequencies and enhance the image frequency response of the receiver. As an example, the selected IF for this receiver may be 175 MHz+/−25.5 MHz. High side LO mixing is used (LO Frequency=1759.5 MHz). Filter 702 may also reduce the level of interference signal at the input of amplifier 704, resulting in lower intermodulation noise generated at the output of amplifier 704. Amplifier 704 also may provide amplification to in-band signals before down conversion to an IF by mixer 706, using the local oscillator 708 having a frequency for "High side" injection in the mixer 706 of ($F_{IF}=F_{LO}-F_{RF}$, where $F_{IF}$ is the intermediate frequency, $F_{LO}$ is the local oscillator frequency and $F_{RF}$ is the GNSS radio frequency). An unmodulated Continuous Wave (CW) or Direct Sequence modulated Spread Spectrum (DSSS) pilot signal generator 710, which may correspond to the pilot signal generator 125 of FIG. 1, may produce pilot signals F1 and F2 that are converted by mixer 712 and mixer 714, which may correspond to mixer 140 or mixer 185 of FIG. 1, using local oscillator LO-2 746 to produce signals S1 and S2. S1 and S2 are bandpass filtered by bandpass filters 716 and 718, the results of which are added by summers 720 and/or 722, which may correspond to summer 120 of FIG. 1, to the IF signal.

Still referring to FIG. 7, the IF chain following mixer 706 and summers 720 and 722 includes a series of IF amplifier/SAW filter combination such as filters 724, 728, 734, and/or 738, and amplifiers 726, 730, 732, 736, and/or 740. In some embodiments, the amplifiers may be identical and/or the SAW filters may be identical. The combination of a bandpass filter sandwiched by two amplifiers (for example, filter 728 sandwiched by amplifier 726 and amplifier 730) may be referred to as a prototype active bandpass filter. In FIG. 7, the prototype active bandpass filter is repeated two times but in other embodiments, depending on use-case specific requirements, the number of repetitions may be different. As described herein, the repeating prototype filter may increase or maximize both frequency selectivity and linearity of a composite, active bandpass filter. The prototype filter components may be chosen to increase adjacent band rejection while ensuring that the amplifier operates well below its 1 dB GCP in the presence of strong adjacent band signals that are likely to be encountered. Selection of prototype filter components may be applied to each prototype filter separately or in combination. Constructing a composite filter from a number of atomic prototypes may help streamline the design process and facilitate component procurement.

A SAW filter's center frequency and frequency response may drift depending on the ambient temperature. If this temperature-based drift is not compensated, a guard band may need to be included in the design. The guard band translates to a minimum frequency separation for an adjacent band signal. In practice, these guard bands may be in the range of 4 to 10 MHz relative to upper and lower band edges of the IF filter. As mentioned earlier, conventional receivers compensate for SAW filter temperature drift by an open loop approach. According to various embodiments described herein, a more robust, closed loop approach for compensating for SAW filter frequency drift is presented.

Still referring to FIG. 7, the output of amplifier 740 is input into a gain control amplifier 742 to produce an amplified signal at the intermediate frequency. A mixer 744 responsive to local oscillator 746 uses the intermediate frequency signal to produce a baseband I/Q channel signal. The baseband I/Q channel signal is filtered by low pass filter 748 and digitized by ADC(s) 750 to produce, for example, a 3-bit encoded signal. The digitized signal is input to a baseband processor 752, that may correspond to processor 130 of FIG. 1.

Figure 8:
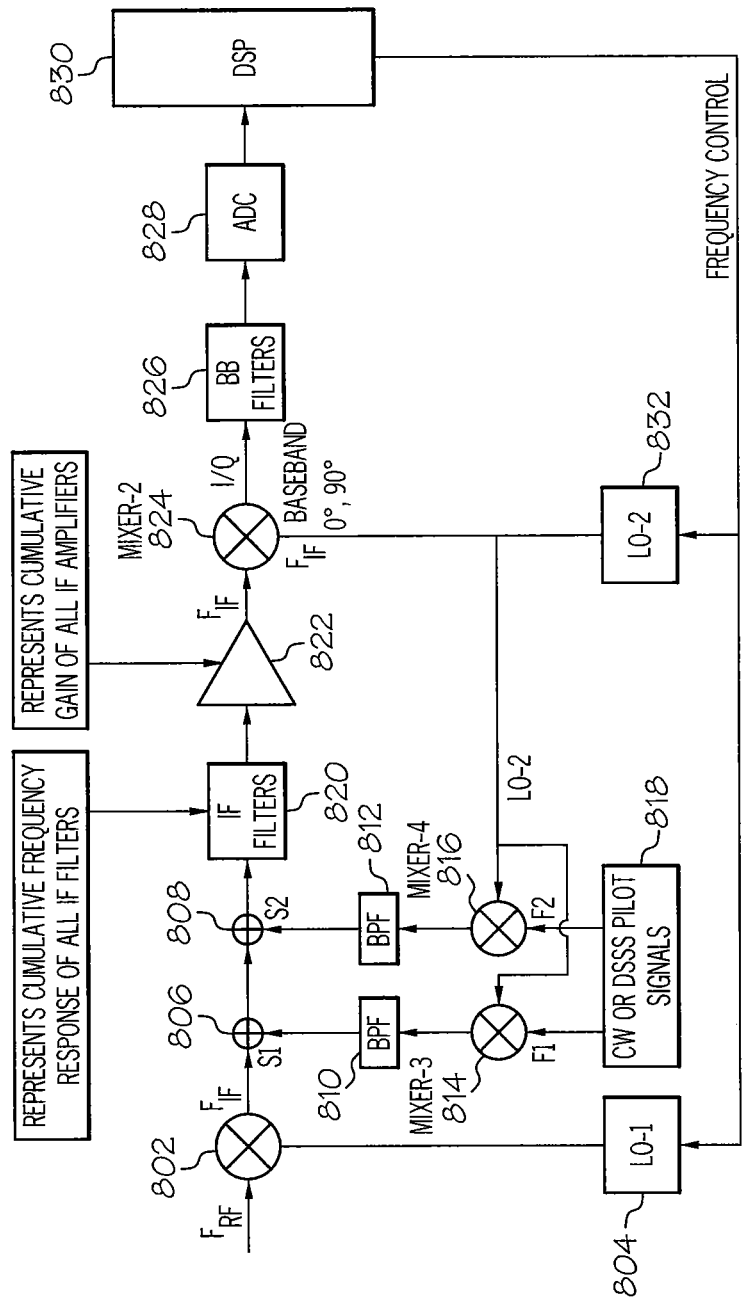
FIG. 8 is a block diagram of a closed loop feedback system/method for frequency drift compensation, according to various embodiments described herein.

FIG. 8 is a block diagram of a closed loop feedback system/method for frequency drift compensation that may be used in conjunction with the IF and baseband processing sections of FIG. 7. As illustrated in FIG. 8, a cumulative shift in the frequency response of IF SAW filters due to temperature change is compensated by alteration of Local Oscillator frequencies from local oscillators 804 and 832, in a closed loop feedback system. Referring to FIG. 8, an intermediate frequency (IF) signal $F_{IF}$ is output from mixer 802 response to the RF front end signal $F_{RF}$ and a signal from a local oscillator 804. The combined frequency drift of IF SAW filters is sensed by measuring two out of band, pilot signals generated by, for example, a CW or Direct Sequence Spread Spectrum (DSSS) pilot signal generator 818. The pilot signals of FIG. 8 may correspond, for example to the pilot signals at F1=34.5 MHz and F2=33.5 MHz, as discussed with respect to FIG. 7. These pilot signals are low frequency, frequency stable reference signals, up-converted to IF band by mixer 814 and mixer 816. Mixers 814 and 816 use the local oscillator 832 frequency $F_{LO2}$ for "high side" injection ($S1=F_{LO2}+F1, S2=F_{LO2}-F2$). SAW bandpass filters 810 and 812 at the mixer 814 and 816 outputs select proper (upper or lower side band) pilot signals for linear addition to the IF signals. Due to the previously described techniques of generating pilot signals, these signals S1 and S2 remain aligned to the IF. As used herein, "aligned" may mean that a signal maintains a fixed frequency-offset relative to another signal.

Still referring to FIG. 8, the IF signal $F_{IF}$ is summed with signals S1 and S2 using summers 806 and 808. The resulting output of summer 808 is input to a composite of IF filters 820. In some embodiments, IF filters 820 is a cumulative representation of the frequency response of one or more IF filters in the receiver. For example, if a temperature variation causes the frequency response of the composite IF filter 820 to shift down in frequency by 4 MHz, the nominal IF of 175 MHz is also shifted down by 4 MHz to 171 MHz due to the LO-1 frequency change. The pilot signals are also shifted down by exactly 4 MHz. After shifting, the frequency offsets of S1 and S2 relative to the IF remain unchanged.

The pilot signals F1 and F2 may be Continuous Wave (CW), and/or Direct Sequence Spread Spectrum (DSSS) modulated with PN code signals S1 and S2 (for example, with a chip rate: 100 K chips/s), injected before the first IF filter of the composite IF filters 820, with a duty cycle of, for example, 1/10, for an active cycle of 100 ms for every second. Other duty cycles and pilot signal repetition periods, designed for specific applications and use cases, may be chosen without departing from the teachings herein.

The spread spectrum modulation of the pilot signals F1 and F2 helps to mitigate against received, adjacent band interference that is co-channel with one or more of the pilot signals. After despreading, the pilot signal may be compressed to a narrow bandwidth, which will pass relatively little of the interference signal power. The DSSS signal may be spectrally shaped to further reduce its spectrum occupancy.

Figure 9:
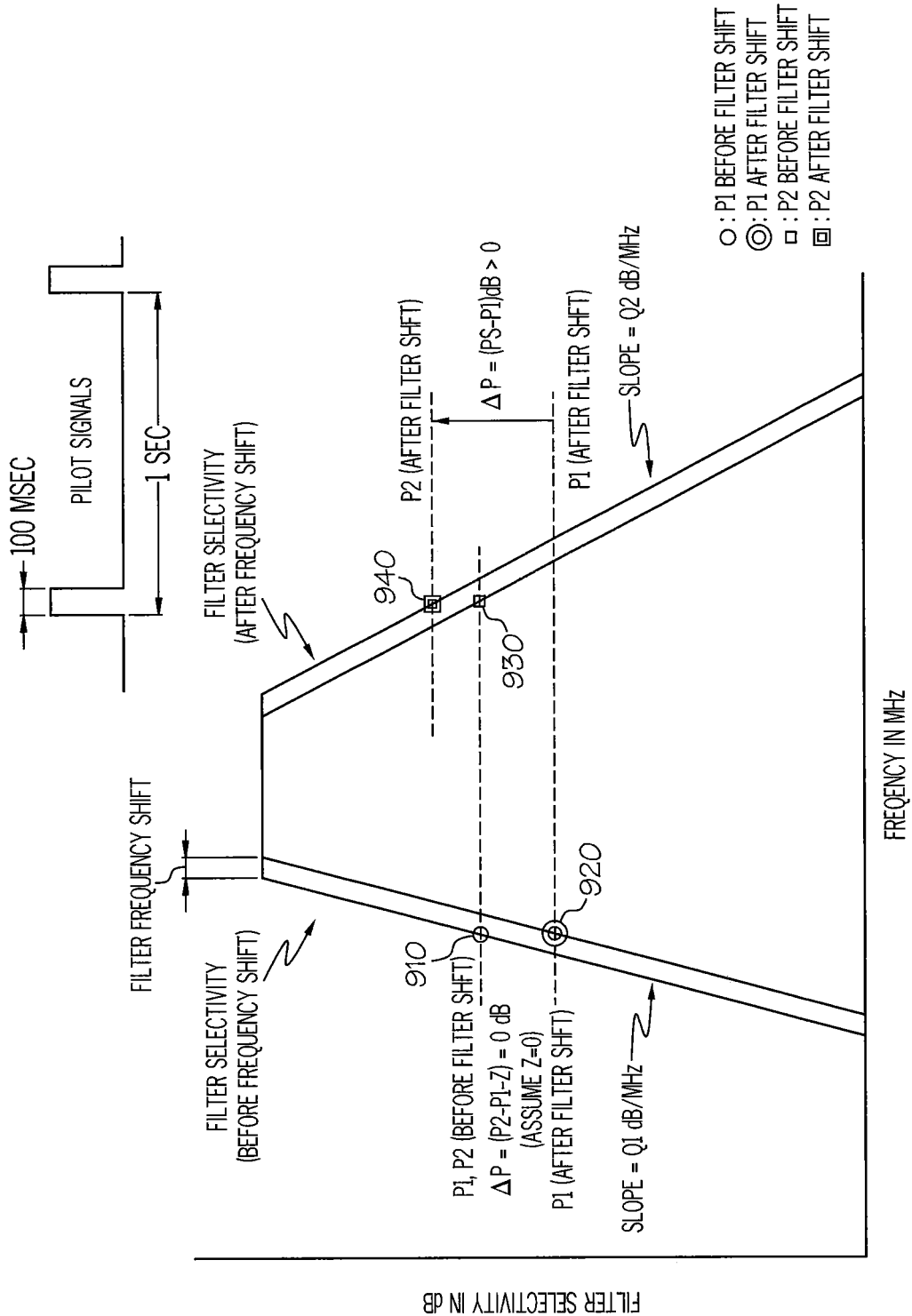
FIG. 9 graphically illustrates placement of pilot signals in the receivers of FIG. 1, FIG. 7, and/or FIG. 8, according to various embodiments described herein.

FIG. 9 illustrates placement of pilot signals in the receivers of FIG. 1, FIG. 7, and/or FIG. 8. Referring to FIG. 9, pilot signals are placed on the lower slope of the cumulative filter selectivity transition band and on the upper slope of the cumulative filter selectivity transition band. The pilots signals of FIG. 9 may correspond, for example, to first and second pilot signals 190 and 195 of FIG. 1. A filter frequency shift occurs due to characteristics of the receiver. The pilot signals are received and processed by the baseband signal processor, also referred to as a DSP (Digital Signal Processor). This may be applicable to direct quadrature down conversion to digital complex baseband, as illustrated in FIG. 1. However, the methods and systems described herein are equally applicable to other embodiments described herein. For the first pilot signal, 910 indicates power level P1 before the filter shift occurs whereas 920 indicates the power level after the filter shift occurs. For the second pilot signal, 930 indicates power level P2 before the filter shift occurs whereas 940 indicates the power level after the filter shift occurs.

The received time averaged power levels P1 and P2 are computed in the baseband processor, which may include a microcomputer and/or circuits running signal and protocol processing tasks. An algorithm described below and illustrated in FIGS. 10 and/or 11 may determine the direction (i.e. increment or decrement) of the local oscillator frequency shifts. N may be defined as the number of signal power measurements over pre-determined time such as, for example, a few seconds. As illustrated in FIG. 9, $\Delta P = P2 - P1 - Z$ (dB), where Z is a design parameter used to normalize $\Delta P$ at room temperature (i.e. $\Delta P = 0$ dB at room temperature). More specifically, Z represents the value of $\Delta P$, at the factory at the time of manufacture, with the pilot signals set at their nominal frequencies. Typically, Z would be measured at the factory at the time of manufacture and utilized by the receiver over its lifetime. Z would be specific to each receiver. By being specific to a receiver, Z represents manufacturing tolerances in the cumulative frequency responses of the filters in the receiver chain.

Figure 10:
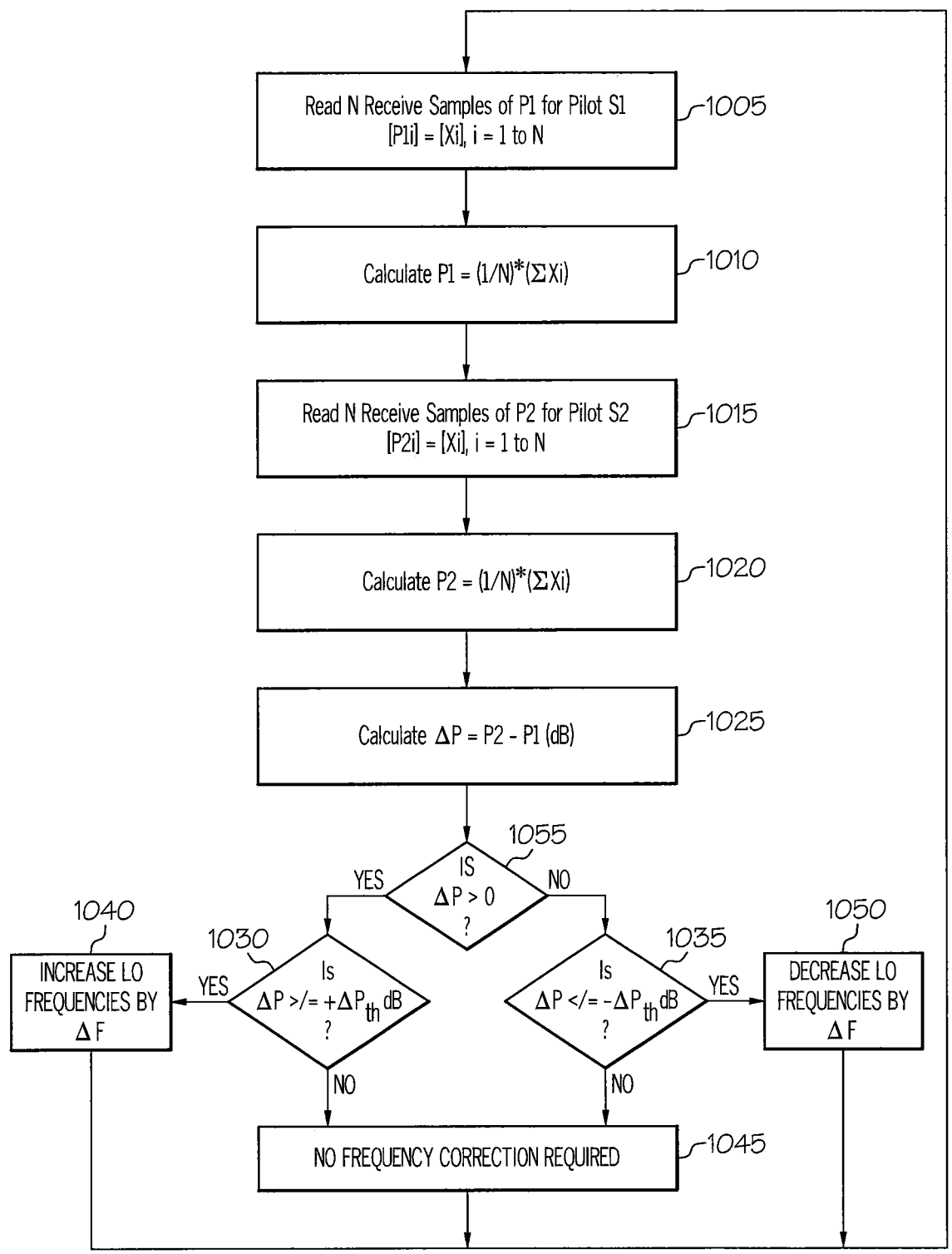
FIGS. 10 and 11 are flowcharts of operations of the closed loop frequency drift compensation system/method of FIGS. 1, 7, and/or 8, according to various embodiments described herein.
Figure 11:
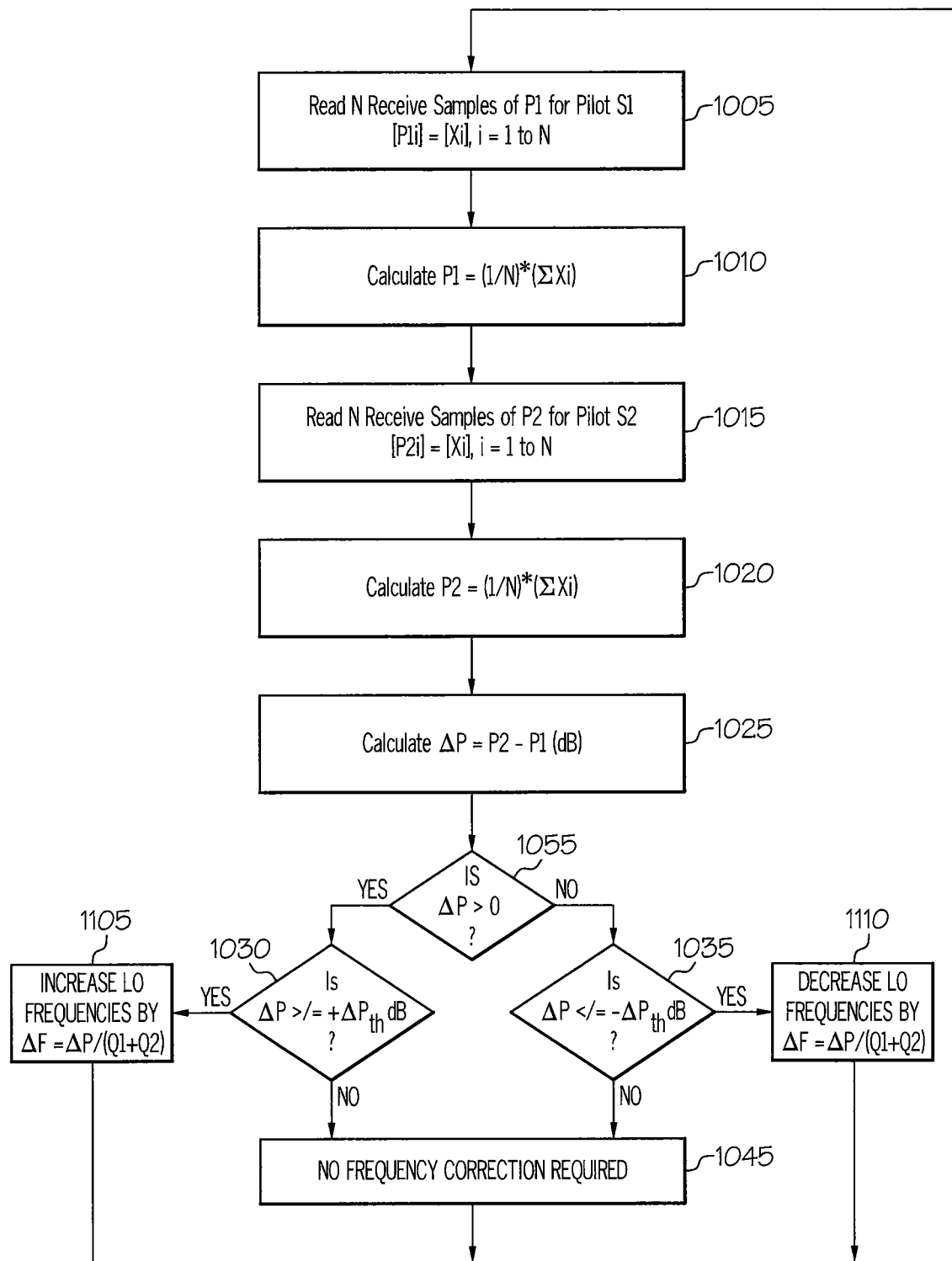

FIGS. 10 and 11 are flowcharts for frequency correction in the closed loop frequency drift compensation system of FIGS. 1, 7, and/or 8. As illustrated in FIG. 10, if $\Delta P$ is higher than or equal to a threshold value, $\Delta P_{th}$, (where $\Delta P_{th}$ is a positive value) such as, for example, 1 dB, at a given temperature, the local oscillator LO-1 frequency and/or of the local oscillator LO-2 frequency may be increased by a predetermined, arbitrary frequency increment $\Delta F$, such as 50 kHz. If $\Delta P </= -\Delta P_{th}$ at a given temperature, the local oscillator LO-1 frequency and/or of the local oscillator LO-2 frequency may be decreased by $\Delta F$. This process may be repeated until the residual $\Delta P$ has a magnitude that is less than $\Delta P_{th}$, resulting in no further local oscillator frequency correction being required.

The purpose of a non-zero $\Delta P_{th}$ is to introduce some hysteresis in the feedback loop. Without this hysteresis, there may be excessive jitter in the local oscillator frequencies, which may introduce harmful phase/frequency modulation to the GNSS signals. To further reduce the impact on the GNSS signals, the frequency correction loop may be designed to work intermittently, such as every few seconds, depending on the expected rate of change of the ambient temperature. Alternatively, the threshold may be varied over time to reduce jitter and/or for other purposes.

The sign of $\Delta P$ (positive or negative) indicates the direction of drift (increment or decrement) of the composite IF filter's frequency response. By shifting local oscillator LO-1 in the same direction as the drift, the IF is also shifted in the same direction, ultimately, after the process has converged, placing the GNSS IF signals at the approximate center of the drifted composite IF filter response. By shifting the local oscillator LO-2 frequency by the same value and in the same direction as the IF shift, the zero-IF (or other low IF) center frequency of the complex baseband signal is preserved. The pilot signals are shifted by the same value and in the same direction as the IF shift, thus preserving their relative spectral position with respect to shifted IF center frequency.

Referring to FIG. 11, the frequency shift, $\Delta F$, may not be fixed and arbitrary as in FIG. 10, but based on the known nominal slopes of the composite IF bandpass filter. At each step of the process, a calculated $\Delta F$ is used which is designed to take the local oscillator frequencies towards their optimum values. For example, if the slopes are defined as Q1 dB/MHz for the lower transition band, and Q2 dB/MHz for the upper transition band, as illustrated in FIG. 9, $\Delta F = \Delta P/(Q1+Q2)$ MHz. For example, if Q1=10 dB/MHz, Q2=8 dB/MHz, and $\Delta P$ is 6 dB, the $\Delta F$ used will be (6/18)=0.333 MHz. This will enable the final local oscillator frequencies to be achieved, ideally, in a single step, compared to 6 or 7 steps, as may be the case in the embodiment of FIG. 10. If, however, due to inaccurate knowledge of the frequency response slopes of the composite IF bandpass filter, a $\Delta P$ value may remain, whose magnitude is higher than $\Delta P_{th}$, then the above step is repeated. This process is repeated until the residual $\Delta P$ has a magnitude that is less than $\Delta P_{th}$. The advantage of the embodiment of FIG. 11 over the embodiment of FIG. 10 may be more rapid convergence to the final local oscillator frequencies. The techniques described above may also compensate for variations in the frequency response of the composite IF bandpass filter due to manufacturing tolerances of the components of the filters. The various embodiments described herein may apply equally for mitigating such variations.

The flowcharts of FIGS. 10 and 11 will now be described in greater detail. It is noted that blocks 1005 to 1035 of FIGS. 10 and 11 are identical so the description of these blocks will not be repeated for each of FIGS. 10 and 11. Referring now to FIG. 10, at block 1005, N received samples of P1 for pilot S1 are read, i.e. [P1$i$]=[Xi], i=1 to N. At block 1010, P1 is calculated as P1=(1/N)*(ΣXi). Other forms of averaging, such as with a digital lowpass filtering, may be used without departing from the essential elements of the invention. At block 1015, N received samples of P2 for pilot S2 are read, i.e. [P2$i$]=[Xi], i=1 to N. At block 1020, P2 is calculated as P2=(1/N)*(ΣXi). At block 1025, ΔP is calculated as ΔP=P2−P1 (dB). At block 1055, ΔP is compared to 0 and if ΔP>0, flow proceeds to block 1030. If ΔP is not >0 then flow proceeds to block 1035. At block 1030, ΔP is compared to +ΔP$_{th}$. If ΔP>/=+ΔP$_{th}$, the flow proceeds to block 1040, where the local oscillator frequency is increased by ΔF. At block 1035, ΔP is compared to −ΔP$_{th}$. If ΔP</=−ΔP$_{th}$, flow proceeds to block 1050, where the local oscillator frequency is decreased by ΔF. If the comparisons of blocks 1030 and 1035 are both untrue, no frequency correction occurs, at block 1045. Referring now to FIG. 11, at block 1030, ΔP is compared to +ΔP$_{th}$. If ΔP>/=+ΔP$_{th}$, flow proceeds to block 1105, where the local oscillator frequency is increased by ΔF=ΔP/(Q1+Q2). At block 1035, ΔP is compared to −ΔP$_{th}$. If ΔP</=−ΔP$_{th}$, flow proceeds to block 1110, where the local oscillator frequency is decreased by ΔF=ΔP/(Q1+Q2). If the comparisons of blocks 1030 and 1035 are both untrue, no frequency correction occurs, at block 1045.

Additional embodiments that may include a single pilot signal will now be discussed. Embodiments related to a single pilot signal may be feasible in cases of low IF amplifiers gain drift, such as <+/1 dB gain drift. Although IF amplifiers with such a low gain drift may not be widely available today, they be envisioned in the future, and/or with the judicious use of Automatic Gain Control (AGC) loop independent of frequency control loop. The single pilot signal case may be applied to GPS systems/methods that include stable amplifier gain or a system with AGC that does not vary much over the operational temperature range. Although GPS system with stable amplifier gain may not be widely available today, they be envisioned in the future. As in the case of the dual pilot system described above, the single pilot system may measure the received level of the pilot signal at the time of manufacture, at room temperature, and utilize it over the lifetime of the receiver.

Figure 12:
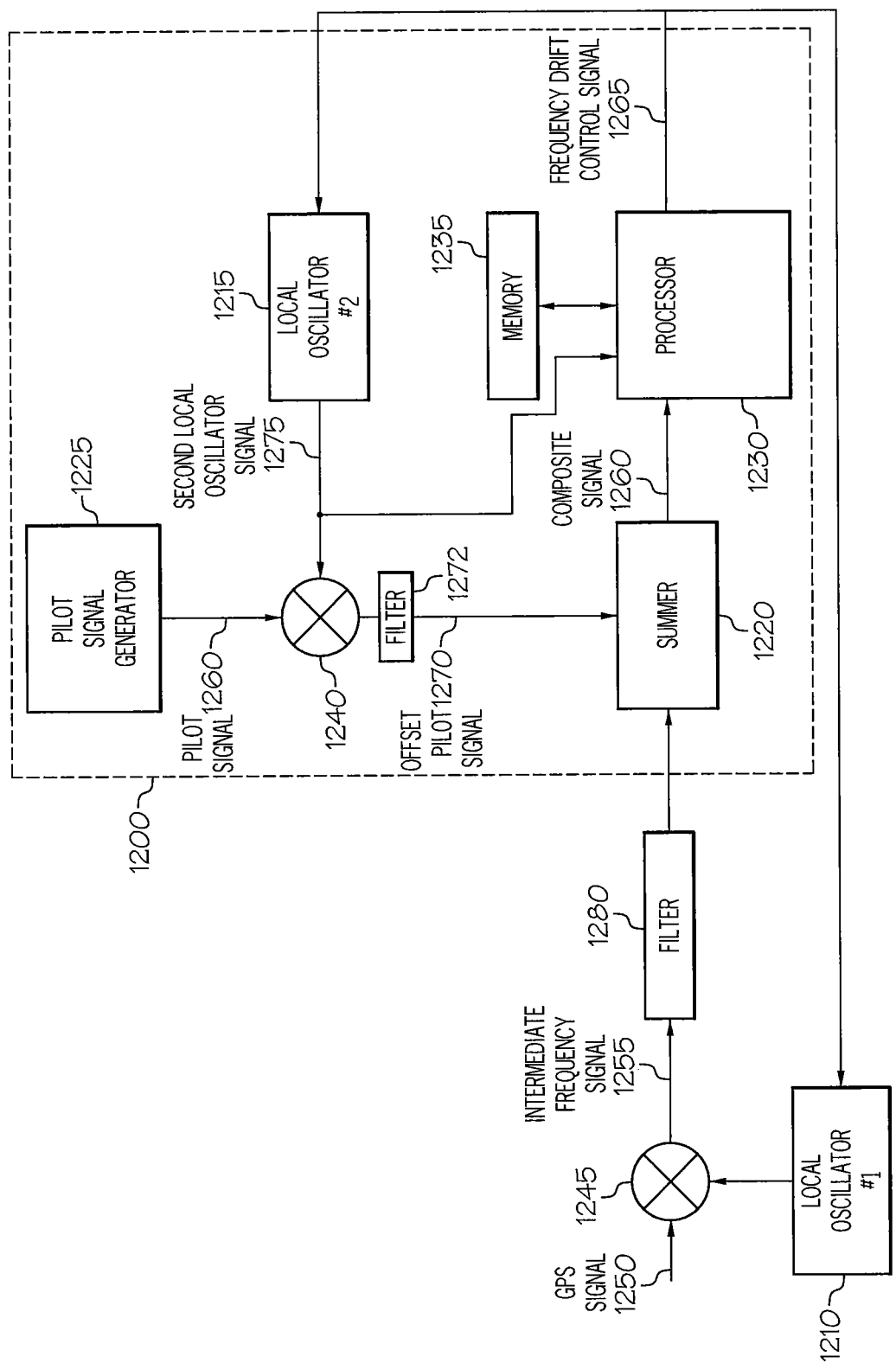
FIGS. 12 to 14B are block diagrams of a GPS receiver including a frequency drift compensation system/method, according to various embodiments described herein.

Referring now to FIG. 12, a block diagram of a frequency drift compensation system/method 1200 for a GPS receiver is illustrated, according to various embodiments described herein. A received GPS signal 1250 is input to a first mixer 1245. The GPS signal 1250 is in a GPS frequency range of 1559-1610 MHz. The first mixer 1245 is responsive to the received GPS signal 1250 and to a first local oscillator 1210 at a first local oscillator frequency to down-convert the received GPS signal 1250 into an intermediate frequency signal 1255. In one example embodiment, the GPS signal 1250 may be at a center frequency of 1584.5 MHz, the local oscillator frequency may be at a frequency of 1759.5 MHz such that the intermediate frequency signal 1255 is at a frequency of 175 MHz. The intermediate frequency signal 1255 is filtered by filter 1280. In some embodiments, filter 1280 may be a bandpass filter. In some embodiments, filter 1280 represents a cumulative frequency response of one or more intermediate frequency filters in the system.

Still referring to FIG. 12, the frequency drift compensation system/method 1200 includes a pilot signal generator 1225 that is configured to generate a pilot signal 1260 at a pilot signal frequency. The frequency drift compensation system/method includes a second local oscillator 1215 that is configured to generate a second local oscillator frequency signal 1275 at a second local oscillator frequency. A signal from a second mixer 1240 that is responsive to the pilot signal 1260 and to the second local oscillator signal 1275 may be filtered by filter 1272 to generate an offset pilot signal 1270 at an offset pilot frequency. A summer 1220 is configured to add the offset pilot signal 1270 to the intermediate frequency signal 1255 or to a filtered version of the intermediate frequency signal 1255 to obtain a composite signal 1260. In some embodiments, a processor 1230 is configured to detect the pilot signal 1270 power drift due to IF filter center frequency drift. The processor 1230 generates a frequency drift control signal 1265 to compensate for the frequency drift, based on an average value of the pilot signal power. The processor 1230 is coupled to a memory 1235 that stores information related to the various calibrated pilot signal powers at the drifted IF filter center frequencies described herein for use in computation of the frequency drift control signal 1265. The first local oscillator 1210 is configured to adjust the first local oscillator frequency and/or the second local oscillator 1215 is configured to adjust the second local oscillator frequency, responsive to the frequency drift control signal 1265.

Figure 13:
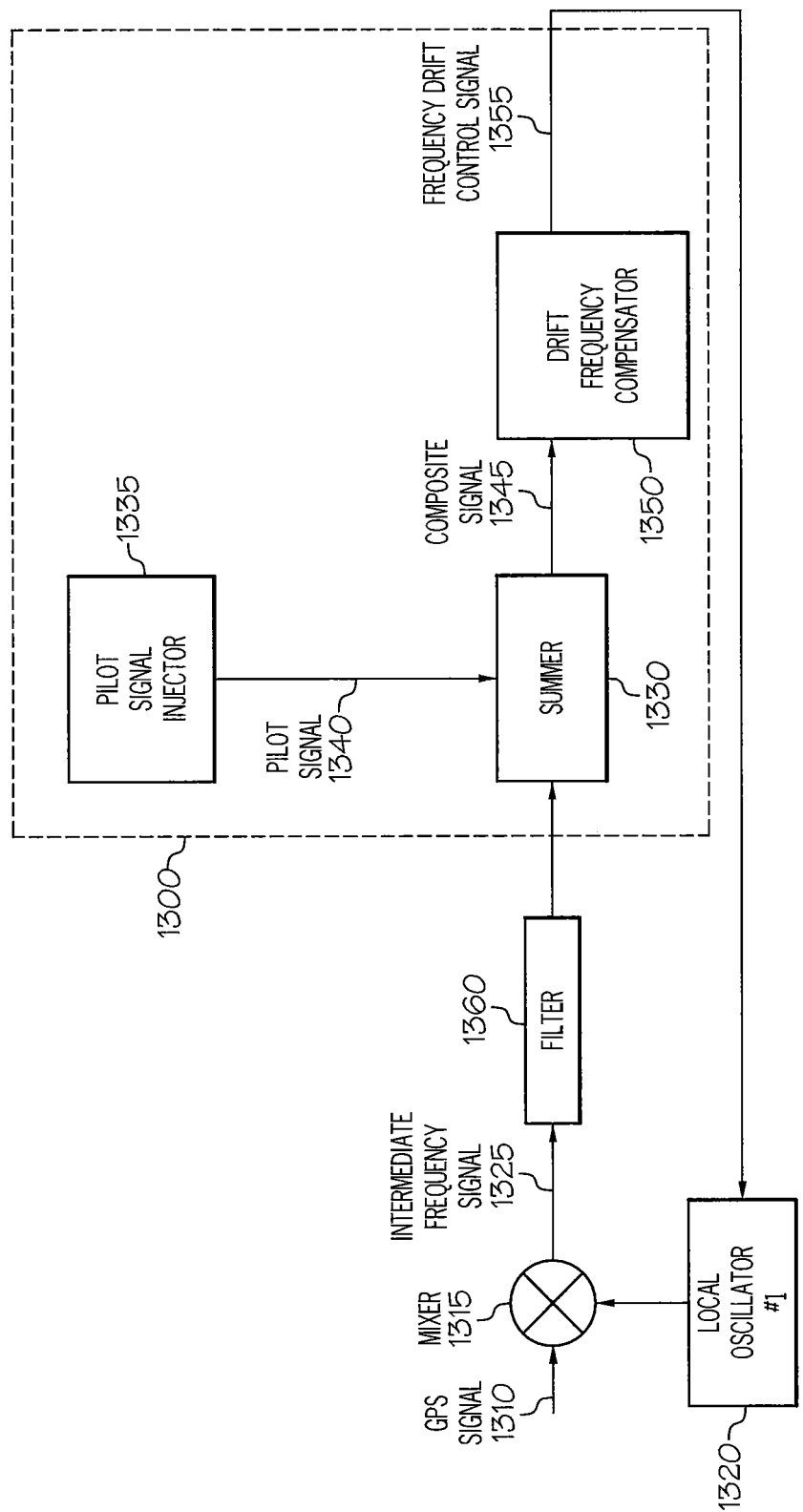

Referring now to FIG. 13, a block diagram of a frequency drift compensation system/method 1300 for a GPS receiver is illustrated, according to other embodiments described herein. A received GPS signal 1310 is input to a mixer 1315. The mixer 1315 is responsive to the received GPS signal 1310 and to a local oscillator 1320 at a local oscillator frequency to down-convert the received GPS signal 1310 into an intermediate frequency signal 1325. In some embodiments, a pilot signal injector 1335 generates a pilot signal 1340 at a pilot signal frequency. A summer 1330 adds the pilot signal 1340 to the intermediate frequency signal 1325 or to a filtered version of the intermediate frequency signal 1325 output by filter 1360 to obtain a composite signal 1345. A drift frequency compensator 1350 detects the pilot signal power and compares it to the stored values in memory (1235 of FIG. 12) to determine the frequency shift of IF filters. The drift frequency compensator 1350 generates a frequency drift control signal 1355 to compensate for the frequency drift. The local oscillator 1320 is configured to adjust the local oscillator frequency, responsive to the frequency drift control signal 1355.

Still referring to FIG. 13, the frequency drift compensation system/method 1300 for a radio receiver for processing of a radio signal comprising a radio frequency spectrum, the radio receiver having a cumulative frequency response, is illustrated. The frequency drift compensation system/method 1300 includes a pilot signal injector circuit 1335 that is configured to inject one or more local pilot signals 1340 that sense a frequency drift of the cumulative frequency response of the radio receiver. A drift frequency compensator 1355 is configured to adjust a local oscillator frequency of the radio receiver to compensate for the frequency drift such that the cumulative frequency response is substantially centered on the radio frequency spectrum. In some embodiments, the drift frequency compensator 1350 may be configured to perform closed loop adjustments that do not utilize a look up table of temperature versus characteristics of filters and/or other radio receiver components.

The frequency drift compensation system/method attempts to keep the cumulative frequency response relatively centered on the desired radio signal spectrum. In order to accomplish this, intermediate frequency (IF) is adaptive, i.e the IF is a variable IF in this radio architecture. The cumulative frequency response is tracking the radio signal spectrum. In other words, if the filter's frequency response moves in a given direction on the radio signal spectrum, the variable IF is also moved in the same direction on the radio signal spectrum such that the cumulative frequency response is tracking the radio signal spectrum. A goal of the frequency drift compensation system/method is to try to track the movement of the filter by changing the IF frequency.

Figure 14A:
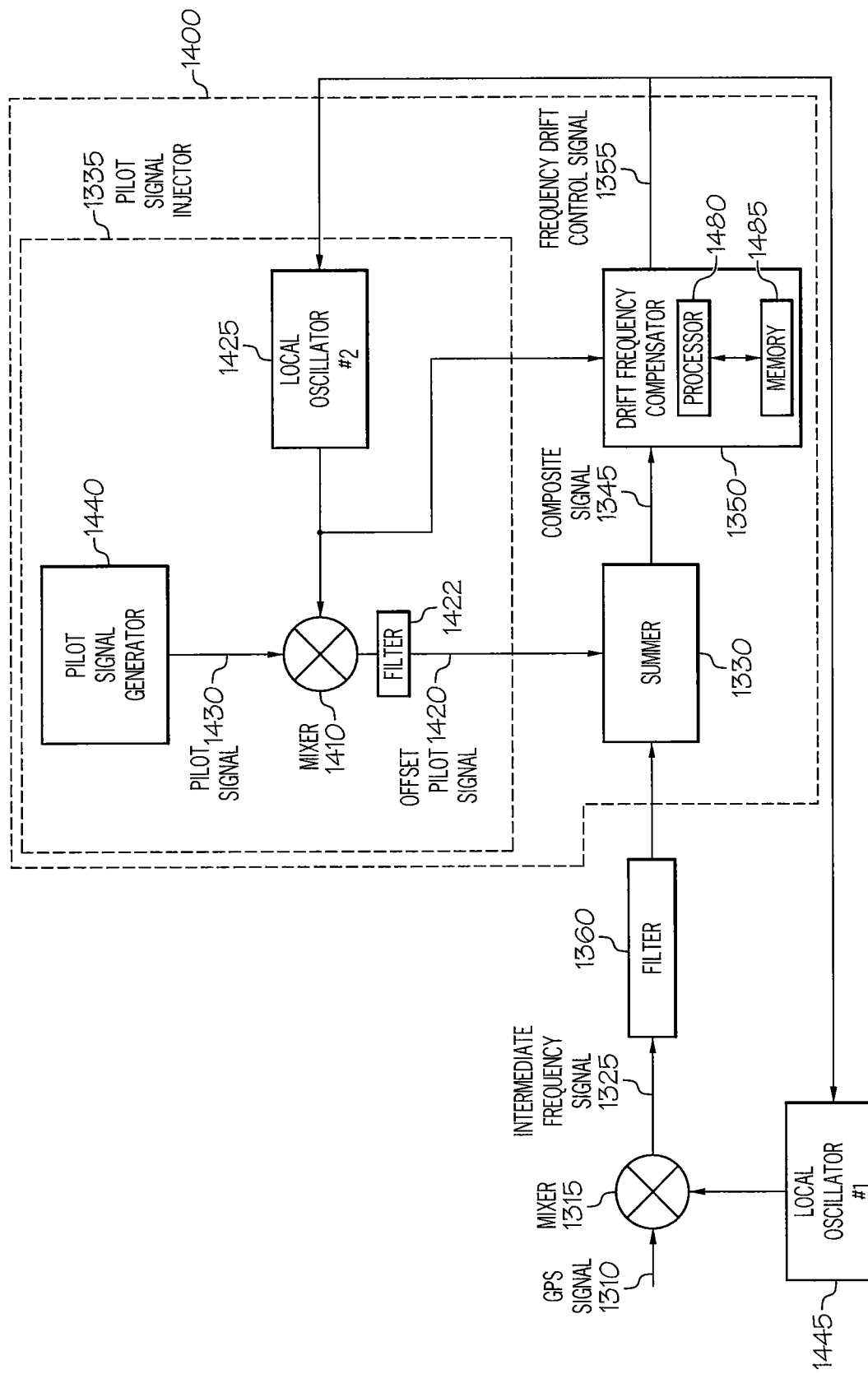

Referring now to FIG. 14A, a block diagram of a frequency drift compensation system/method 1400 for a GPS receiver is illustrated, according to other embodiments described herein. The frequency drift compensation system/method 1400 of FIG. 14A may include various components of the frequency drift compensation system of FIG. 13, and like numbers will be used to designate these components. A received GPS signal 1310 is input to a mixer 1315. The mixer 1315 is responsive to the received GPS signal 1310 and to a first local oscillator 1445 at a first local oscillator frequency to down-convert the received GPS signal 1310 into an intermediate frequency signal 1325. In some embodiments, the pilot signal injector 1335 of FIG. 13 is configured to generate an offset pilot signal 1420 at an offset pilot signal frequency. The pilot signal injector 1335 of FIG. 13 includes a pilot signal generator 1440 that is configured to generate a pilot signal 1430. A mixer 1410 is responsive to the pilot signal 1430 and to a second local oscillator 1425 at a second local oscillator frequency to down-convert the pilot signal 1430. The signal output from mixer 1410 may be filtered by filter 1422 to generate the offset pilot signal 1420. A summer 1330 is configured to add the offset pilot signal 1420 to the intermediate frequency signal 1325 or to a filtered version of the intermediate frequency signal 1325 output by filter 1360 to obtain a composite signal 1345. A drift frequency compensator 1350 detects frequency drift in the pilot signal 1430 responsive to the composite signal 1345. The drift frequency compensator 1350 generates a frequency drift control signal 1355 to compensate for the frequency drift. The first local oscillator 1445 is configured to adjust the first local oscillator frequency and/or the second local oscillator 1425 is configured to adjust the second local oscillator frequency, responsive to the frequency drift control signal 1355. The drift frequency compensator 1350 includes a processor 1480 coupled to a memory 1485 that stores information related to the various signals described herein for use in computation by the processor 1480 of the frequency drift control signal 1355.

Figure 14B:
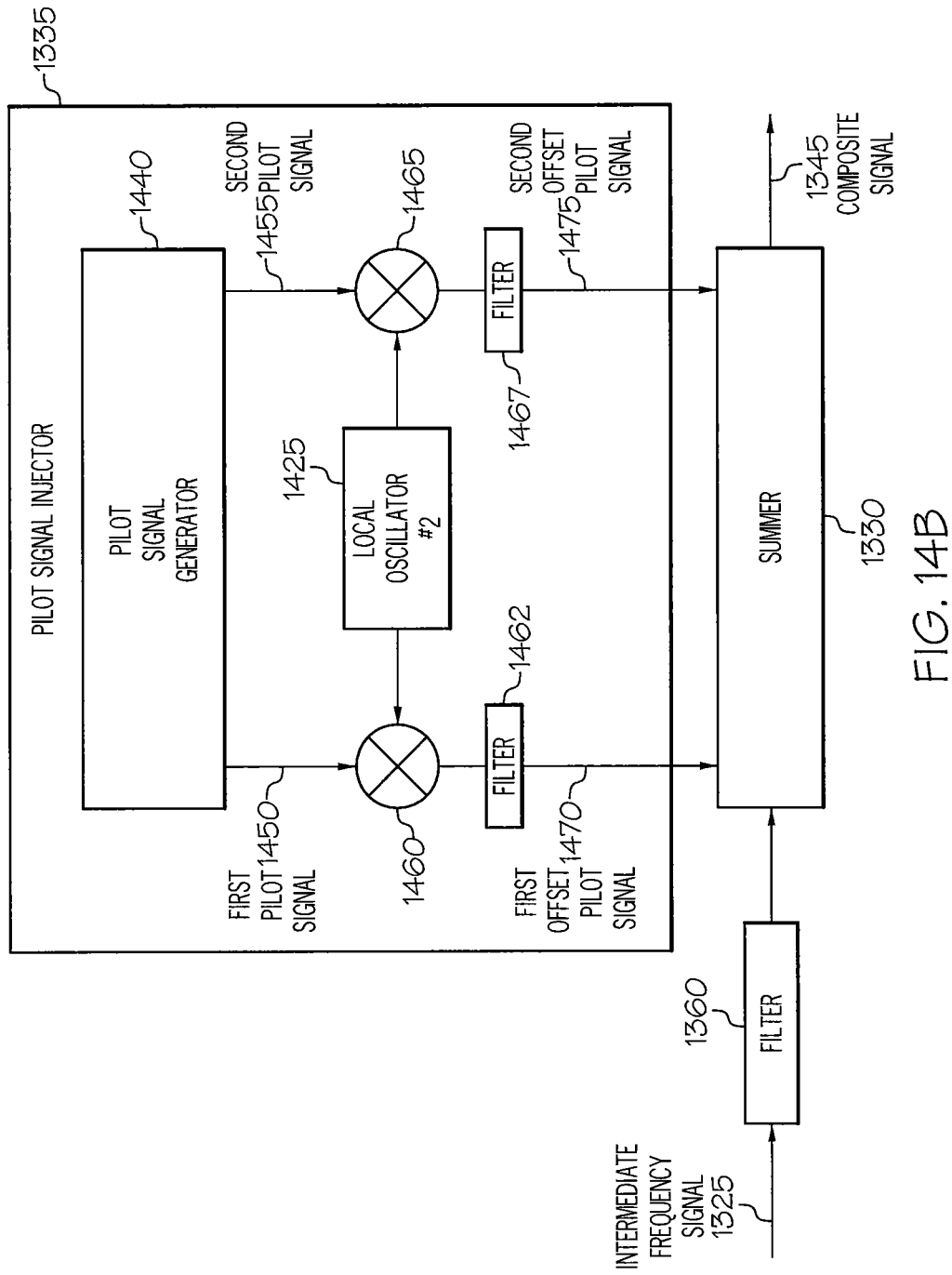

FIG. 14B illustrates further details of the pilot signal injector 1335 of FIG. 14A. Referring now to FIG. 14B, the pilot signal injector 1335 of FIG. 13 and/or FIG. 14A include a pilot signal generator 1440 that is configured to generate a first pilot signal 1450 and a second pilot signal 1455. A mixer 1460 is responsive to the first pilot signal 1450 and to a second local oscillator 1425 at a second local oscillator frequency to down-convert the first pilot signal 1450. The down-converted first pilot signal may be filtered by filter 1462 to generate a first offset pilot signal 1470. A mixer 1465 is responsive to the second pilot signal 1455 and to the second local oscillator 1425 at the second local oscillator frequency to down-convert the second pilot signal 1455. The down-converted second pilot signal may be filtered by filter 1467 to generate a second offset pilot signal 1475. Summer 1330 adds the intermediate frequency signal 1325 or to a filtered version of the intermediate frequency signal 1325 output by filter 1360 to the first offset pilot signal 1470 and/or to the second offset pilot signal 1475 to obtain a composite signal 1345.

Referring again to FIG. 14A and FIG. 14B, processor 1480 of the drift frequency compensator 1350 determines a first average pilot power associated with the first pilot signal 1450 based on the composite signal 1345. Processor 1480 determines a second average pilot power associated with the second pilot signal 1455 based on the composite signal 1345. Processor 1480 may then determine a difference between the second average pilot power and the first average pilot power. The difference between the second average pilot power and the first average pilot power is used to generate the frequency drift control signal 1355. The frequency drift control signal 1355 indicates increasing the first local oscillator frequency and/or the second local oscillator frequency, when the difference between the second average pilot power and the first average pilot power is higher than a threshold value. The frequency drift control signal 1355 indicates decreasing the first local oscillator frequency and/or the second local oscillator frequency, when the difference between the second average pilot power and the first average pilot power is less than the threshold value. The frequency drift control signal 1355 indicates no change to the first local oscillator frequency and/or the second local oscillator frequency, when the difference between the second average pilot power and the first average pilot power is less than the threshold value and the difference between the second average pilot power and the first average pilot power is higher than the threshold value.

Figure 15:
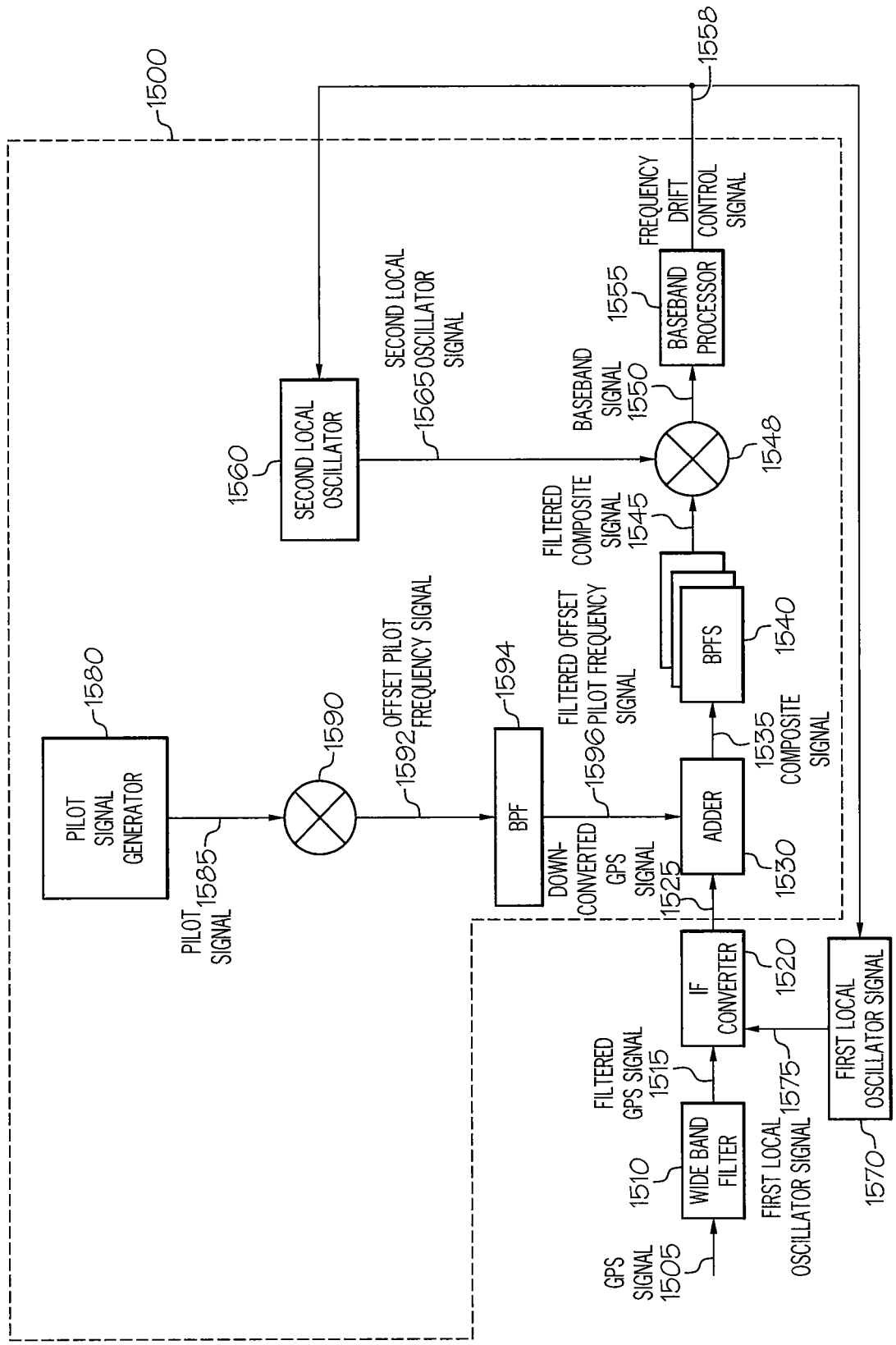
FIG. 15 is a block diagram including the pilot signal injector of FIGS. 14A and/or 14B, according to various embodiments described herein.

Referring now to FIG. 15, a block diagram of a frequency drift compensation system 1500 for a GPS receiver is illustrated, according to other embodiments described herein. A received GPS signal 1505 is input to a wideband filter 1510. The wideband filter 1510 filters the received GPS signal 1505 to output a filtered GPS signal 1515. The filter GPS signal 1515 is down-converted by an intermediate frequency (IF) converter 1520 to produce a down-converted GPS signal 1525. The frequency drift compensation system includes a pilot signal generator 1580 that produces a pilot signal 1585 at a pilot signal frequency. A mixer 1590 that is responsive to the pilot signal 1585 and a first local oscillator frequency signal 1575 that is generated by a first local oscillator 1570 produces an offset pilot frequency signal 1592. The offset pilot frequency signal 1592 is input to a bandpass filter 1594 that produces a filtered offset pilot frequency signal 1596. An adder and/or summer 1530 sums the filtered offset pilot frequency signal 1596 and the down-converted GPS signal 1525 to produce a composite signal 1535. The composite signal 1535 is filtered by one or more bandpass filters 1540. The one or more active bandpass filters 1540 may be a series of serially connected filters that each may include a first amplifier, a second amplifier, and a frequency selective filter that is between the first amplifier and the second amplifier. The one or more active band pass filters filter the composite signal 1535 to obtain a filtered composite signal 1545. A mixer 1548 is responsive to the filter composite signal 1545 and second local oscillator frequency signal 1565 from a second local oscillator 1560 to produce a baseband signal 1550. The baseband signal 1550 is processed by a baseband processor 1555 to obtain a frequency drift control signal 1558. The first local oscillator 1570 is configured to adjust the first local oscillator frequency and/or the second local oscillator 1560 is configured to adjust the second local oscillator frequency, responsive to the frequency drift control signal 1558.

Figure 16:
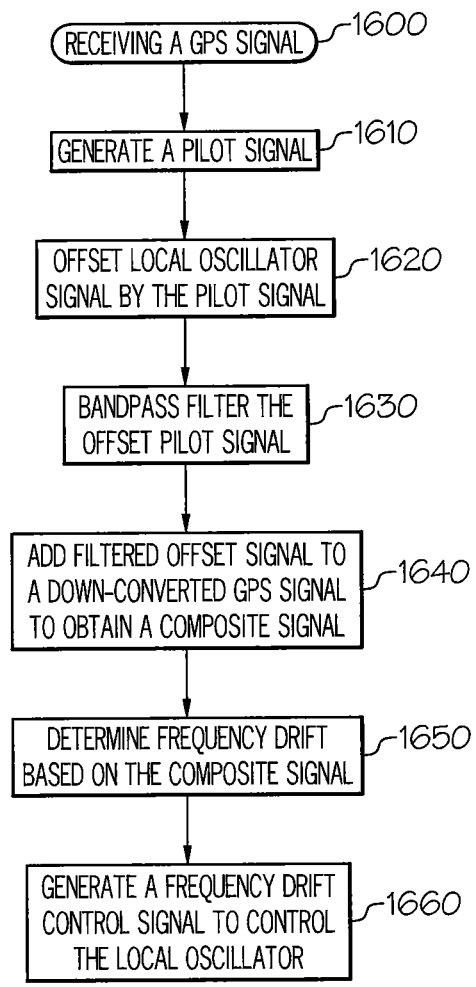
FIG. 16 is a flowchart of operations for frequency drift compensation of a GPS system, according to various embodiments described herein.

FIG. 16 is a flowchart of operations for a GPS system of FIGS. 12, 13, 14A and/or 15. Referring now to FIG. 16, a GPS signal may be received at block 1600. At block 1610, a pilot signal is generated that is at a pilot signal frequency such as, for example, 34.5 MHz. At block 1620 a local oscillator frequency signal is offset by the pilot signal to obtain an offset pilot frequency signal at an offset pilot frequency. For example, the local oscillator frequency signal may be at 175 MHz to produce an offset pilot frequency signal at 209.5 MHz. At block 1630, the offset pilot frequency signal is bandpass filtered to obtain a filtered offset pilot frequency signal. At block 1640, the filtered offset pilot frequency signal is added to a down-converted GPS signal that is based on the GPS frequency signal in the receiver of the GPS system to produce a composite signal. At block 1650, the frequency drift is determined based on the composite signal. At block 1660, a frequency drift control signal is generated to control the local oscillator. The frequency drift control signal is based on the oscillator drift that was determined to compensate for the frequency drift of one or more filters in the receiver for the GPS system.

Various embodiments described herein may enable compatible operation of strong, adjacent-band terrestrial signals and weak GNSS satellite signals without overloading the GNSS receivers. Strong, adjacent-band terrestrial signals may be handled with a small frequency offset of the terrestrial signals from the GNSS band (1559 to 1610 MHz) than conventional receivers. These GNSS receivers may be realized using highly frequency selective, active, one or more IF bandpass filters, a composite active bandpass filter with a cascade of a plurality of identical, prototype, and/or active bandpass filters, each using commercially available, off the shelf (COTS) components. As described herein, the frequency response drift of the cascaded prototype filters caused by temperature variations and/or manufacturing variations, may be adaptively compensated utilizing a closed loop feedback system that adjusts the IF relative to the frequency response of the composite, active, IF bandpass filter. Unlike conventional receivers, the adaptively compensated adjustment of the IF may performed without a priori knowledge (i.e. look up table) of the dependence of filter characteristics on ambient temperature.

According to various embodiments described herein, the adaptive adjustment of the IF are performed with the aide of two pilot signals at the two edges of the composite, active, IF bandpass filter. The pilot signals may be Continuous Wave (CW) or Direct Sequence Spread Spectrum (DSSS) types. The pilot signals that are used may be intermittent in time with a selected duty cycle. The IF may be adjusted when the local oscillator frequencies are in the receiver chain, by adjusting the IF immediately before the composite, active, and/or IF bandpass filters, are adjusted. The frequencies of the pilot signals may be adjusted such that they maintain constant frequency offsets relative to the variable IF. The adjustment of the local oscillator frequencies may be based on the differential levels of the received pilot signals. In some embodiments, the local oscillator frequencies may be adjusted recursively in relatively small, fixed, arbitrary steps. The recursions may be continued until the differential pilot signal level reduces to a value lower than a predetermined threshold value. In some embodiments, the local oscillator frequencies may be adjusted based on a known functional relationship between a delta-LO-frequency and differential pilot signal level, where the functional relationship depends on the slopes of frequency response rolloffs of the composite, active, and/or IF bandpass filters. This process may be repeated until the differential pilot signal level reduces to a value lower than a predetermined threshold value. A highly linear [high 1 dB Gain Compression Point (1 dB GCP)] front-end Low Noise Amplifier with low Noise Figure (NF) specifications may be utilized in order to minimize the possibility of front-end overload and intermodulation product generation.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

For purposes of illustration and explanation only, various embodiments of the present invention were described herein in the context of receivers that are configured to receive GPS signals. It will be understood, however, that the present invention is not limited to such embodiments and may be embodied generally in any wireless communication terminal that is configured to transmit and receive according to one or more radio access technologies.

As used herein, the term "user equipment" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluetRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination. Although the embodiments taught here are applicable to many classes of radio receivers, GPS receivers are of particular interest to this application and are used as an example embodiment in order to explain the inventive concepts. Notwithstanding the above, the embodiments are applicable to any radio receiver. There is no dependence of the embodiments on specific characteristics of the GPS signal or GPS receivers.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A frequency drift compensation system for a radio receiver, the radio receiver comprising a first mixer that is responsive to a received radio signal and to a first local oscillator at a first local oscillator frequency to down-convert the received radio signal into an intermediate frequency signal, and a filter that is configured to filter the intermediate frequency signal, the frequency drift compensation system comprising:

a pilot signal generator that is configured to generate a first pilot signal at a first pilot signal frequency and a second pilot signal at a second pilot signal frequency;

a second local oscillator that is configured to generate a second local oscillator frequency signal at a second local oscillator frequency;

a second mixer that is responsive to the first pilot signal and to the second local oscillator signal to generate a first offset pilot signal at a first offset pilot frequency;

a third mixer that is responsive to the second pilot signal and to the second local oscillator signal to generate a second offset pilot signal at a second offset pilot frequency, a summer that is configured to add the first offset pilot signal and the second offset pilot signal to the intermediate frequency signal to obtain a composite signal; and a processor that is responsive to the composite signal and is configured to detect frequency drift in the first offset pilot signal and/or in the second offset pilot signal to generate a frequency drift control signal to compensate for the frequency drift, wherein the first local oscillator is configured to adjust the first local oscillator frequency and/or the second local oscillator is configured to adjust the second local oscillator frequency, responsive to the frequency drift control signal.

2. The frequency drift compensation system of claim 1, wherein the filter has a center frequency that drifts as function of temperature, and wherein the frequency drift control signal is configured to compensate for the drift.

3. The frequency drift compensation system of claim 2, wherein the filter comprises a surface acoustic wave (SAW) filter.

4. The frequency drift compensation system of claim 1, wherein the first local oscillator is configured to adjust the first local oscillator frequency by performing operations comprising incrementing and/or decrementing the first local oscillator frequency based on the frequency drift control signal, and/or wherein the second local oscillator is configured to adjust the second local oscillator frequency by incrementing and/or decrementing the second local oscillator frequency based on the frequency drift control signal.

5. The frequency drift compensation system of claim 1, wherein the processor is configured to detect frequency drift by performing operations comprising:

determining a first average pilot power associated with the first pilot signal based on the composite signal and the first pilot signal;

determining a second average pilot power associated with the second pilot signal based on the composite signal and the second pilot signal; and determining a difference between the second average pilot power and the first average pilot power.

6. The frequency drift compensation system of claim 5, wherein the processor is configured to detect frequency drift by performing further operations comprising:

generating the frequency drift control signal to indicate increasing the first local oscillator frequency and/or the second local oscillator frequency, in response to the difference between the second average pilot power and the first average pilot power being greater than a threshold value;

generating the frequency drift control signal to indicate decreasing the first local oscillator frequency and/or the second local oscillator frequency, in response to the difference between the second average pilot power and the first average pilot power being less than the threshold value; and generating the frequency drift control signal to indicate no change to the first local oscillator frequency and/or the second local oscillator frequency, in response to the difference between the second average pilot power and the first average pilot power being less than a threshold value and the difference between the second average pilot power and the first average pilot power being greater than the threshold value.

7. The frequency drift compensation system of claim 6, wherein the first local oscillator is configured to increase the first local oscillator frequency by a first fixed frequency increment in response to the frequency drift control signal indicating increasing the first local oscillator frequency, and wherein the second local oscillator is configured to increase the second local oscillator frequency by a second fixed frequency increment in response to the frequency drift control signal indicating increasing the second local oscillator frequency.

8. The frequency drift compensation system of claim 6, wherein the first local oscillator is configured to decrease the first local oscillator frequency by a third fixed frequency decrement in response to the frequency drift control signal indicating decreasing the first local oscillator frequency, and wherein the second local oscillator is configured to decrease the second local oscillator frequency by a fourth fixed frequency decrement in response to the frequency drift control signal indicating decreasing the second local oscillator frequency.

9. The frequency drift compensation system of claim 6, wherein the first local oscillator is configured to increase the first local oscillator frequency by a first variable frequency increment of $\Delta P/(Q1+Q2)$ in response to the frequency drift control signal indicating increasing the first local oscillator frequency, wherein the second local oscillator is configured to increase the second local oscillator frequency by a second variable frequency increment of $\Delta P/(Q1+Q2)$ in response to the frequency drift control signal indicating increasing the second local oscillator frequency, where $\Delta P$ comprises a difference between the second average pilot power and the first average pilot power, where Q1 comprises a slope for a lower transition band of the one or more filters in the receiver, and where Q2 comprises a slope for an upper transition band of the one or more filters in the receiver.

10. The frequency drift compensation system of claim 6, wherein the first local oscillator is configured to decrease the first local oscillator frequency by a third variable frequency decrement of $\Delta P/(Q1+Q2)$ in response to the frequency drift control signal indicating decreasing the first local oscillator frequency, wherein the second local oscillator is configured to decrease the second local oscillator frequency by a fourth variable frequency decrement of $\Delta P/(Q1+Q2)$ in response to the frequency drift control signal indicating decreasing the second local oscillator frequency, where $\Delta P$ comprises a difference between the second average pilot power and the first average pilot power, where Q1 comprises a slope for a lower transition band of the one or more filters in the receiver, and where Q2 comprises a slope for an upper transition band of the one or more filters in the receiver.

11. The frequency drift compensation system of claim 1, wherein the first average pilot power is averaged over a time period that is based on a desired response time, and wherein the second average pilot power is averaged over the time period that is based on a desired response time.

12. The frequency drift compensation system of claim 1, further comprising:

a first bandpass filter connected to the pilot signal generator and the second mixer and is configured to filter the first offset pilot frequency signal to obtain a first filtered offset pilot frequency signal; and a second bandpass filter connected to the pilot signal generator and the third mixer and is configured to filter the second offset pilot frequency signal to obtain a second filtered offset pilot frequency signal, wherein the summer is configured to add the first filtered offset pilot frequency signal, the second filtered offset pilot frequency signal, and the intermediate frequency signal to obtain the composite signal.

13. The frequency drift compensation system of claim 1, wherein the filter that is configured to filter the intermediate frequency signal comprises:

two or more active bandpass filters that filter the composite signal, wherein the two or more active bandpass filters are serially connected such that an input of a succeeding active bandpass filter is connected to an output of a preceding active bandpass filter.

14. The frequency drift compensation system of claim 13, wherein at least two of the two or more active bandpass filters comprise a first amplifier, a second amplifier, and a frequency-selective filter that is connected between the first amplifier and the second amplifier.

15. The frequency drift compensation system of claim 1, wherein the filter that is configured to filter the intermediate frequency signal comprises:

two or more active bandpass filters that filter the composite signal, wherein the two or more active bandpass filters are serially connected such that an input of a succeeding active bandpass filter is connected to an output of a preceding active bandpass filter, and wherein at least two of the two or more active bandpass filters comprise a first amplifier, a second amplifier, and a frequency-selective filter that is connected between the first amplifier and the second amplifier.

16. The frequency drift compensation system of claim 1 in combination with the first mixer, the first oscillator, and the filter to provide the radio receiver.

17. A frequency drift compensation method for a radio receiver for processing of a radio signal comprising a radio frequency spectrum, the radio receiver having a cumulative frequency response, the frequency drift compensation method comprising:

injecting, by the radio receiver, one or more local pilot signals that sense a frequency drift of the cumulative frequency response of the radio receiver; and adjusting a local oscillator frequency of the radio receiver to compensate for the frequency drift such that the cumulative frequency response is substantially centered on the radio frequency spectrum.

18. The method of claim 17, wherein the adjusting the local oscillator frequency of the radio receiver to compensate for the frequency drift comprises performing closed loop adjustments that do not utilize a look up table of temperature versus characteristics of filters and/or other radio receiver components.

19. The method of claim 17, wherein the radio receiver is a GPS receiver.

20. A frequency drift compensation system for a radio receiver for processing of a radio signal comprising a radio frequency spectrum, the radio receiver having a cumulative frequency response, the frequency drift compensation system comprising:

a pilot signal injector circuit that is configured to inject one or more local pilot signals that sense a frequency drift of the cumulative frequency response of the radio receiver; and a drift frequency compensator that is configured to adjust a local oscillator frequency of the radio receiver to compensate for the frequency drift such that the cumulative frequency response is substantially centered on the radio frequency spectrum.

21. The frequency drift compensation system of claim 20, wherein the drift frequency compensator is configured to perform closed loop adjustments that do not utilize a look up table of temperature versus characteristics of filters and/or other radio receiver components.

22. The frequency drift compensation system of claim 20, wherein the radio receiver is a GPS receiver.

23. A frequency drift compensation system for a GPS receiver, the GPS receiver comprising a mixer that is responsive to a received GPS signal and to a local oscillator to down-convert the received GPS signal into an intermediate frequency signal at a local oscillator frequency, and a filter that is configured to filter the intermediate frequency signal, the frequency drift compensation system comprising:

a pilot signal injector circuit that is configured to inject a pilot signal into the intermediate frequency signal by adding the intermediate frequency signal and an offset pilot signal, based on the pilot signal and a second local oscillator frequency signal, to obtain a composite signal; and a drift frequency compensator that is configured to provide a frequency drift control signal to the local oscillator based on frequency drift identified in the composite signal, wherein the local oscillator changes the local oscillator frequency responsive to the frequency drift control signal.

24. The frequency drift compensation system of claim 23, wherein the local oscillator comprises a first local oscillator, the local oscillator frequency comprises a first local oscillator frequency, wherein the mixer comprises a first mixer, and wherein the pilot signal injector circuit comprises:

a pilot signal generator that is configured to generate the pilot signal at a pilot signal frequency;

a second local oscillator that is configured to generate the second local oscillator frequency signal at a second local oscillator frequency;

a second mixer that is configured to generate the offset pilot signal based on the pilot signal and the second local oscillator frequency signal; and a summer that is configured to inject the pilot signal into the intermediate frequency signal by adding the offset pilot signal and the intermediate frequency signal to obtain the composite signal.

25. The frequency drift compensation system of claim 24, wherein the pilot signal comprises a first pilot signal, wherein the pilot signal frequency comprises a first pilot signal frequency, wherein the offset pilot signal comprises a first offset pilot signal frequency, wherein the pilot signal generator is further configured to generate a second pilot signal at a second pilot signal frequency, wherein the pilot signal injector circuit further comprises a third mixer that is responsive to the second pilot signal and to the second local oscillator signal to generate a second offset pilot signal at a second offset pilot frequency, and wherein the summer is further configured to inject the second offset pilot signal into the intermediate frequency signal to obtain the composite signal.

26. The frequency drift compensation system of claim 25, wherein the first offset pilot frequency is greater than the second local oscillator frequency, and
wherein the second offset pilot frequency is less than the second local oscillator frequency.

27. The frequency drift compensation system of claim 25, wherein the drift frequency compensator comprises a processor configured to perform operations comprising:
determining a first average pilot power associated with the first pilot signal based on the composite signal;
determining a second average pilot power associated with the second pilot signal based on the composite signal; and
determining a difference between the second average pilot power and the first average pilot power.

28. The frequency drift compensation system of claim 27, wherein the processor is configured to performing operations further comprising:
generating the frequency drift control signal to indicate increasing the first local oscillator frequency and/or the second local oscillator frequency, in response to the difference between the second average pilot power and the first average pilot power being greater than a threshold value;
generating the frequency drift control signal to indicate decreasing the first local oscillator frequency and/or the second local oscillator frequency, in response to the difference between the second average pilot power and the first average pilot power being less than the threshold value; and
generating the frequency drift control signal to indicate no change to the first local oscillator frequency and/or the second local oscillator frequency, in response to the difference between the second average pilot power and the first average pilot power being less than a threshold value and the difference between the second average pilot power and the first average pilot power being greater than the threshold value.

29. The frequency drift compensation system of claim 25, further comprising:
a first bandpass filter connected to the pilot signal generator and the second mixer and is that is configured to filter the first offset pilot frequency signal to obtain a first filtered offset pilot frequency signal; and
a second bandpass filter connected to the pilot signal generator and the third mixer and is configured to filter the second offset pilot frequency signal to obtain a second filtered offset pilot frequency signal,
wherein the summer is configured to add the first filtered offset pilot frequency signal and the second filtered offset pilot frequency signal to the intermediate frequency signal to obtain the composite signal.

30. The frequency drift compensation system of claim 23, wherein the filter that is configured to filter the intermediate frequency signal comprises:
two or more active bandpass filters that filter the composite signal,
wherein the two or more active bandpass filters are serially connected such that an input of a succeeding active bandpass filter is connected to an output of a preceding active bandpass filter, and
wherein at least two of the two or more active bandpass filters comprise a first amplifier, a second amplifier, and a frequency-selective filter that is connected between the first amplifier and the second amplifier.

31. A radio receiver comprising:
a first local oscillator configured to generate a first local oscillator frequency signal;
a second local oscillator configured to generate a second local oscillator frequency signal;
a wideband filter with a center frequency in a radio frequency band;
an intermediate frequency (IF) converter configured to convert a radio signal that has passed through the wideband filter into a down-converted radio signal at an IF frequency;
a pilot signal generator configured to generate a pilot signal at a pilot signal frequency;
a first mixer configured to mix first local oscillator frequency signal with the pilot signal to generate an offset pilot frequency signal at an offset pilot frequency;
a bandpass filter configured to filter the offset pilot frequency signal to obtain a filtered offset pilot frequency signal;
an summer configured to add the filtered offset pilot frequency signal to the down-converted radio signal to obtain a composite signal;
two or more active bandpass filters comprising a first amplifier, a second amplifier, and a frequency-selective filter that is connected between the first amplifier and the second amplifier, wherein the two or more active bandpass filters are arranged serially and filter the composite signal to obtain a filtered composite signal;
a second mixer configured to mix the filtered composite signal with the second local oscillator frequency signal to obtain a baseband signal; and
a baseband processor configured to generate a frequency drift control signal based on determining an oscillator drift of the baseband signal,
wherein the frequency drift control signal is used by the first local oscillator and the second local oscillator to adjust first local oscillator frequency signal and the second local oscillator frequency signal to compensate for the oscillator drift.

32. A global positioning satellite (GPS) method, the method comprising:
down-converting, with a first local oscillator, a received GPS signal to generate a down-converted GPS signal;
generating a pilot signal at a pilot signal frequency;
offsetting a local oscillator frequency signal generated by a second local oscillator by the pilot signal to obtain an offset pilot frequency signal at an offset pilot frequency;
bandpass filtering the offset pilot frequency signal to obtain a filtered offset pilot frequency signal;
adding the filtered offset pilot frequency signal to the down-converted GPS signal to obtain a composite signal;
determining a frequency drift based on the composite signal; and
generating a frequency drift control signal to control the local oscillator, wherein the frequency drift control signal is based on the oscillator drift that was determined, to compensate for the frequency drift of one or more filters in a receiver for a global positioning satellite (GPS) system.

33. A frequency drift compensation system for a radio receiver, the radio receiver comprising a first mixer that is responsive to a received radio signal and to a first local oscillator at a first local oscillator frequency to down-convert the received radio signal into an intermediate frequency signal, and a filter that is configured to filter the intermediate frequency signal, the frequency drift compensation system comprising:
   a pilot signal generator that is configured to generate a pilot signal at a pilot signal frequency;
   a second local oscillator that is configured to generate a second local oscillator frequency signal at a second local oscillator frequency;
   a second mixer that is responsive to the pilot signal and to the second local oscillator signal to generate an offset pilot signal at an offset pilot frequency;
   a summer that is configured to add the offset pilot signal to the intermediate frequency signal to obtain a composite signal; and
   a processor that is responsive to the composite signal and is configured to detect frequency drift in the offset pilot signal and to generate a frequency drift control signal to compensate for the frequency drift,
   wherein the first local oscillator is configured to adjust the first local oscillator frequency and/or the second local oscillator is configured to adjust the second local oscillator frequency, responsive to the frequency drift control signal.

34. The frequency drift compensation system of claim 33, wherein the pilot signal comprises a first pilot signal,
wherein the offset pilot frequency signal comprises a first offset pilot frequency signal,
wherein the offset pilot frequency comprises a first offset pilot frequency,
wherein the pilot signal generator is further configured to generate a second pilot signal at a second pilot signal frequency,
the frequency drift compensation system further comprising:
   a third mixer that is responsive to the second pilot signal and to the second local oscillator signal and is configured to generate a second offset pilot signal at a second offset pilot frequency,
wherein the summer is further configured to add the second offset pilot signal to the first offset pilot signal and the intermediate frequency signal to obtain the composite signal.

35. The frequency drift compensation system of claim 33, wherein the processor is configured to detect frequency drift by performing operations comprising:
   determining a first average pilot power associated with the first pilot signal based on the composite signal and the first pilot signal;
   determining a second average pilot power associated with the second pilot signal based on the composite signal and the second pilot signal; and
   determining a difference between the second average pilot power and the first average pilot power.

* * * * *